United States Patent [19]

Schwartz et al.

[11] Patent Number: 5,301,280
[45] Date of Patent: Apr. 5, 1994

[54] CAPABILITY BASED COMMUNICATION PROTOCOL

[75] Inventors: Philip L. Schwartz, Framingham; Stuart Warnsman, Southboro; Nicholas Zoda, Jr., Marlboro; John F. Pilat, Hopkinton, all of Mass.

[73] Assignee: Data General Corporation, Westboro, Mass.

[21] Appl. No.: 416,225

[22] Filed: Oct. 2, 1989

[51] Int. Cl.$^5$ ............................................. G06F 13/20
[52] U.S. Cl. ........................... 395/325; 364/238.3; 364/241.9; 364/240.8; 364/239; 364/240.9; 364/246; 364/284; 364/284.1; 364/284.2; 364/284.3
[58] Field of Search ... 364/200 MS File, 900 MS File; 395/250, 650, 700, 200

[56] References Cited

U.S. PATENT DOCUMENTS

| | | | |
|---|---|---|---|
| 4,317,957 | 3/1982 | Sendrow | 340/825.34 |
| 4,747,050 | 5/1988 | Brachtl et al. | 364/408 |
| 4,755,940 | 7/1988 | Brachtl et al. | 364/408 |
| 4,907,271 | 3/1990 | Gilham | 380/25 |
| 4,941,089 | 7/1990 | Fischer | 364/200 |

Primary Examiner—Gareth D. Shaw
Assistant Examiner—John Q. Chavis
Attorney, Agent, or Firm—Sewall P. Bronstein; Robert F. O'Connell

[57] ABSTRACT

A communication protocol available to any type module on the computer bus. Application programs are treated as clients or servers. A serveport is created in the server module. A client issues a connect request to the server identifying the serveport. The server assigns a N-slot TID capability to identify, describe and protect a storage location for receiving a start buffer from the client and sends the N-slot TID to the client to establish a connection. The start buffer includes a TID list which permits the client and server to reliably communicate back and forth. Once a connection has been established, data can be moved between the server and the client. High-level instructions and commands are sent as data through these connections. After the communication has been completed, the connection can be disconnected by the client or broken by the server.

16 Claims, 25 Drawing Sheets

CAPABILITY BASED COMMUNICATION PROTOCOL

BACKGROUND OF THE INVENTION

This invention is directed to an upper level capability-based transaction protocol for use over a message based bus so that communications may occur through the bus between intelligent nodes, whether they both be host systems or one a host system and the other an IO device.

Local area networks are generally used to provide intercommunication between a number of host systems. Communications between hosts and IO devices are generally provided over IO buses. An IO bus generally provides for device specific commands such as writes or reads to specific registers. A local area network is not set up to accommodate such specific commands. Therefore, a local area network cannot generally be used for communications between a host and IO devices. Additionally, neither local area networks nor I/O buses use capabilities as their fundamental addressing paradigm. In general, a capability identifies the location and size of a buffer as well as other attributes such as access rights.

An IO bus generally operates with an address phase and a data phase. This suffers from the disadvantage that should an error occur in the address phase, actions may be taken at the wrong locations. Error checking mechanisms are available to prevent such occurences, however, such checking may slow down the system. The present invention minimizes the possibility of such errors. The use of capabilities protects a node's memory from similar failures by putting upper and lower bounds on a buffer and in the present invention, access rights identified for the buffer.

It is an object of the present invention to provide a protocol which may be used for intercommunications between any two intelligent nodes. It is a further object of the present system to provide a protocol which is the same for IO devices and host systems, making the bus available to both. A further object is to base these protocols on an underlying capability-based bus. It is still a further object of the present invention to support communications between clients and shared servers.

SUMMARY OF THE INVENTION

The present invention is directed to a capability-based transaction protocol for use over a message based bus connecting multiple host systems and IO device controllers. The protocol is based on a client server model in which all modules on the bus are interchangeably clients or servers.

In accordance with the protocol of the present invention, communications begin by creating a serveport in the server module. The serveport is a data structure in the server memory and it is given a name for identification. A client wishing to communicate with the server through the created serveport transmits a connect request which includes the serveport name and a client node number identifying the client host system or I/O device itself. The server transmits a connect answer back to the client indicating if the serveport name exists in its list of serveports. When the name exists, the connect answer includes a TID which identifies a storage location in the server for receiving a start buffer. A TID (transaction identifier) is a capability number transmitted over the bus which when mapped identifies in several respects the storage location for its associated buffer. The TID identifies at least the address, size and access rights of its associated storage location.

The connect answer completes a communication connection between the client and the server. The start buffer is a collection of data which includes, among other things, a list of TIDs which identify storage locations in the client for handling data transferred between the server and the client. In preparation for sending a start buffer, the client builds what is called herein an action. An action is a data structure, part of which is understood by the bus interface hardware. In the client, the start buffer itself is constructed and stored in the action and identified by an n-slot TID. A TID map table is prepared by adding a pointer to the table, corresponding to the n-slot TID so that the client hardware can send the start buffer out over the bus from its source TID in the client to the destination TID in the server. In preparation for receiving a start buffer and communicating with the client, the server also builds an action. Upon receiving the start buffer, the server is in a position to perform any operations calling for a data transfer to or from the client TIDs listed in the start buffer. The users of this protocol utilize the start buffer to begin a service request, which is fulfilled by moving data between the client and server plus whatever work the server must perform to generate the correct response data. This data which is passed to the server or moved back into the client in response to the start buffer may be of any variety. The data may be complete messages including instructions, data from a database or file, data from memory, data from an IO device, data specifying a register or even data relating to the operation of the connection protocol.

As such, the present system advantageously can pass information between host systems, between device controllers or between a host system and a device controller since the same protocol may be used by both, uniformly to exchange information. More particularly, the present system advantageously uses capabilities to create connections between clients and servers so that reliable communications can take place simply through the TIDs supplied in the start buffer.

DETAILED DESCRIPTION OF THE PREFERRED EMBODIMENT

Figure 1:
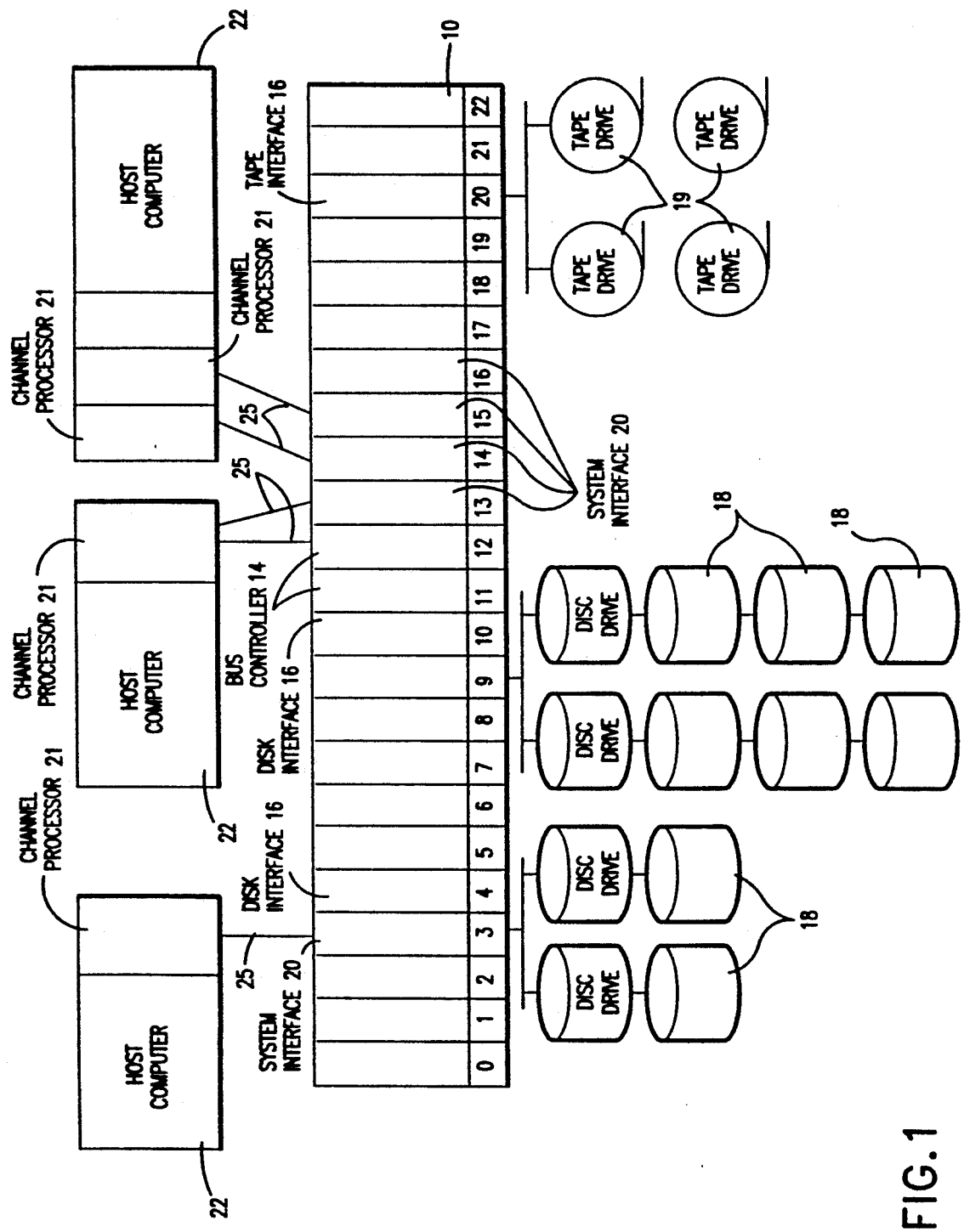
FIG. 1 is a block diagram of a basic arrangement for a message-based channel system on which the present invention is implemented.

Referring now to the drawings, a block diagram of the typical system for employing the transaction protocol of the present invention is shown in FIG. 1. A message-based reliable channel 10 is provided as the backplane of a computer chassis. The message-based reliable channel 10 is a computer bus having a number of lines for providing communications between intelligent nodes on the bus. The presently preferred channel uses synchronous operation to provide a 32 bit wide data path. Each chassis is provided with a bus controller 14 which may include functions such as diagnostics, synchronization, power up, initialization, clock generation, fault detection and correction, configuration control and the like. The chassis may include a redundant bus controller 14 to provide enhanced fault tolerance.

The message-based channel 10 is provided for implementing communications between a number of different intelligent nodes. Each node includes a channel connected to either a host system or to one or more IO devices 18 or 19. A host channel consists of a system interface 20 on the message-based channel 10, a host system 22 containing a channel processor 21 and a bus 25 interconnecting the channel processor with the system interface. The host system 22 consists of one or more computer processors, memories and channel processors 21. The channel processor resides in the host system 22 and connects to the system interface 20 through an interchassis link 25. A host 22 may also be connected to more than one system interface 20, located on the same message based channel 10 to provide enhanced fault tolerance or in a different chassis to provide the host system with an even greater selection of devices and other hosts to communicate with.

An IO channel is functionally implemented within a device interface 16. The device interface is connected at a node to the message based channel 10, IO devices, such as disc drives 18 or tape drives 19 are controlled by the device interface 16 through a bus. The device interface 16 in FIG. 1 is referred to as either a disk interface or a tape interface depending upon its respective IO device. The IO devices may be any common computer IO device including tapes, disc drives, CD ROMS, printers or other such device. The number of device interfaces 16 which may be attached to the channel 10 is only limited by the size of the chassis.

In order to provide a system that can support communications between host systems as well as between IO devices and the hosts, a capability-based transaction protocol of the present invention has been provided so that both types of communications can be supported on the message-based bus 10. In order to implement the transaction protocol over the bus 10, each system interface 20 and host system 22 channel as well as each device controller 16 are provided with an interface layer in software and/or firmware referred to herein as the capability-based communication interface layer. The interface layer provides the connections for enabling communications between the variety of nodes on the bus 10. The interface layer sets up communication between a client, such as a host system, and its server, such as an IO device. The capability-based communication interface layer of the present invention is oblivious to the messages being passed back and forth as data over the bus.

In accordance with the protocol of the present invention, communications take place between a client and a server. Under the client/server model, a computer program is divided into two components, a client application and a server application. In general, the server application provides some functionality, such as a data base storage system for example, which is useful to one or more client applications, such as a report generator. While not necessary to the client/server model, the clients and server usually run in different computers. The present invention refers to these computers and I/O devices as "nodes". This invention's protocol is connection-based, meaning that the clients and server first explicitly establish a communication pathway, then use the pathway to send and receive a series of messages, then explicitly destroy the pathway when the client no longer needs to communicate with its server.. This pathway is called a "connection".

Figure 2A:
FIG. 2A is a representation of bus-level packet of the prior art.

Referring now to FIGS. 2A and B, packets sent through a bus are illustrated. FIG. 2A shows a packet illustrative of prior art systems, such as ISO/OSI. A packet contains a header H and trailer T for each of the different levels in which communication is taking place. These levels from lowest to highest include the physical bus level, data link level, network level, transport level, session level, presentation level and application level. In accordance with the protocol of the present invention, all of these headers and trailers are not required. The present invention transfers capabilities, referred to as TIDS, between the client and server to set up a connection. Once the connection is set up it is only necessary to pass a TID with the data to fully identify the destination of the correct buffer within a node's memory. Application programs can communicate by interacting with the capability-based protocol. Moreover, the capability-based protocol uses itself in setting up connections. The protocol of the present invention is uniquely at least a session level program.

The TID is a capability in that it allows one node to access exactly one fixed-sized buffer in another node's memory. The node wanting access is the "initiator" and provides the source TID, the other node is the "responder" which uses the destination TID to identify the desired buffer. The responder can use all, some, or none of the source TID to provide complete protection ("fully dedicated"- a complete 32 bit match), partial protection ("node dedicated"- only the 8 bit node number must match), or no protection ("undedicated"- none of the 32 bits are checked) respectively. Since the bus message also indicates the direction of data transfer, the responder can prevent read and/or write access to the buffer (i.e., a "read-only capability"). The responder can also control whether the capability is reusable or is destroyed on its first use (the TID's buffer can't be accessed more than once). This is a more robust amount of functionality than is usually referred to as a capability in the literature.

Figure 2B:
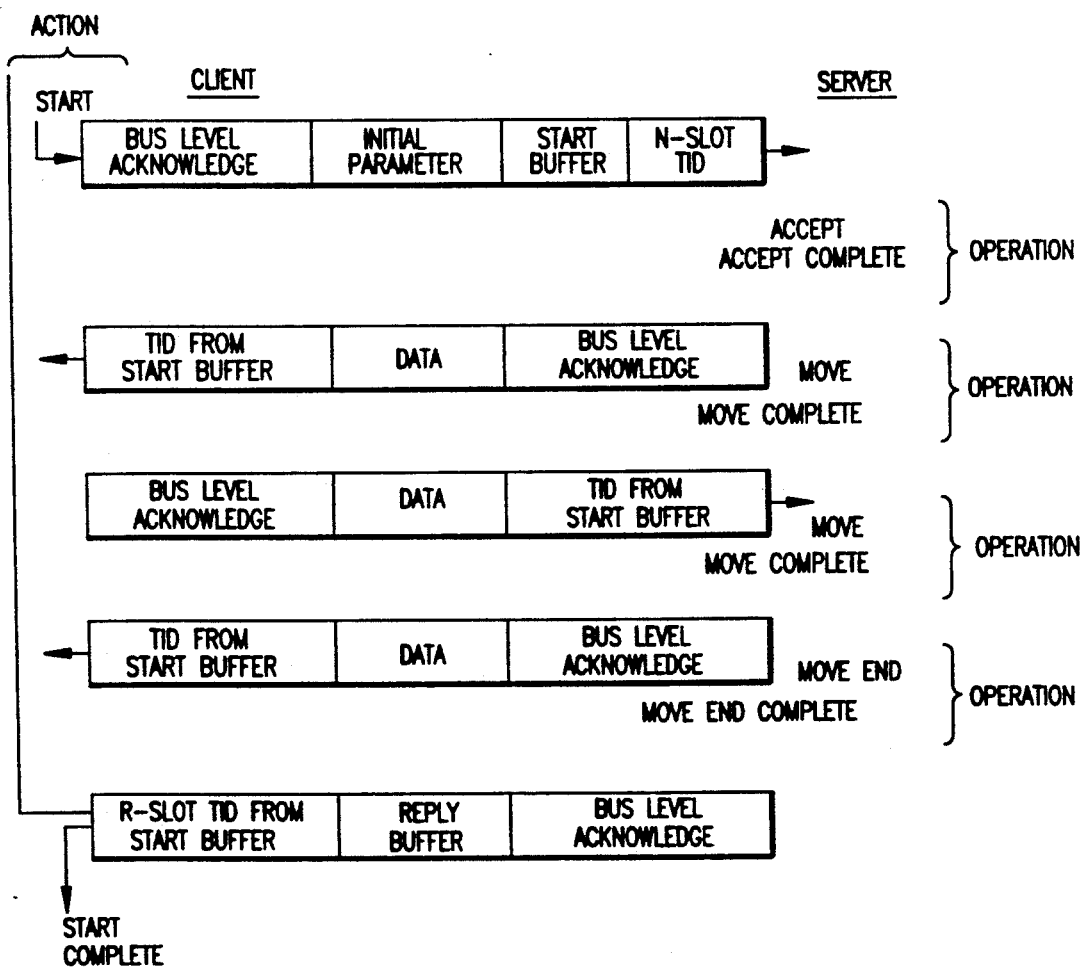
FIG. 2B is a representation of a series of bus-level packets of the present invention.

FIG. 2B shows the messages sent back and forth between a client and server after a connection has been set up. The arbitrarily large amount of data which may be transferred in one message of the present invention would typically require several packets in systems of the prior art. The connection provides the client with the n-slot TID in the server. This identifies the location of the storage locations which will receive the start buffer. The start buffer includes a list of TIDs from the client which are prepared to handle data transfers between the client and the server. Thus, the first message shows a start buffer to the n-slot TID in the server. This message may optionally include an initial parameter to get the data transfer started immediately and inform the server of the service function being requested. The bus requires an acknowledgement portion to indicate completion of the packet. Now the server can communicate with the client. Messages are sent to the TIDs listed in the start buffer one at a time as move operations are performed by the server's capability-based interface layer. These messages only require the TID from the start buffer, data and a bus acknowledge. When the data transfers are completed as indicated by the move end operation, the server fills its reply buffer. The reply buffer is sent to the Reslot TID in the client. This is one of the TIDs always included in the start buffer. The reply buffer includes a number of pieces of information including the completion status of the client server request. The reply buffer signals the completion of the start operation in the client. Further requests can take place along the client-server connection as long as the connection is in place.

In forming a connection, the capability based protocol builds up a number of data structures in the client and server. Communications begin with the creation of a serveport in the server. Serveports are created and assigned a name. The name is assigned by the server application. The serveport names are administered in such a way as to generate their uniqueness from among all possible current and future serveports. Serveports essentially act as mailboxes for receiving messages. The serveport name acts as the address.

A client application wishing to make use of a server application, establishes communication with the server application by connecting to the server application's serveport. In order to connect, the client must know a prior serveport name and the node of the server application's serveport.

Once a client application establishes a connection, it can communicate with its server application by starting an action against the serveport. An action consists of at least two messages, a start request from the client to the server and a start complete including the reply from the server to the client. The present invention as shown in FIG. 2B also permits other data to be transferred between a client and its server, in both directions while the action is outstanding. When the client no longer needs to communicate with its server, the client application disconnects from the serveport at which point no further communication with the server application is possible. It would also be possible for the server to break a connection with a client.

Figure 3:
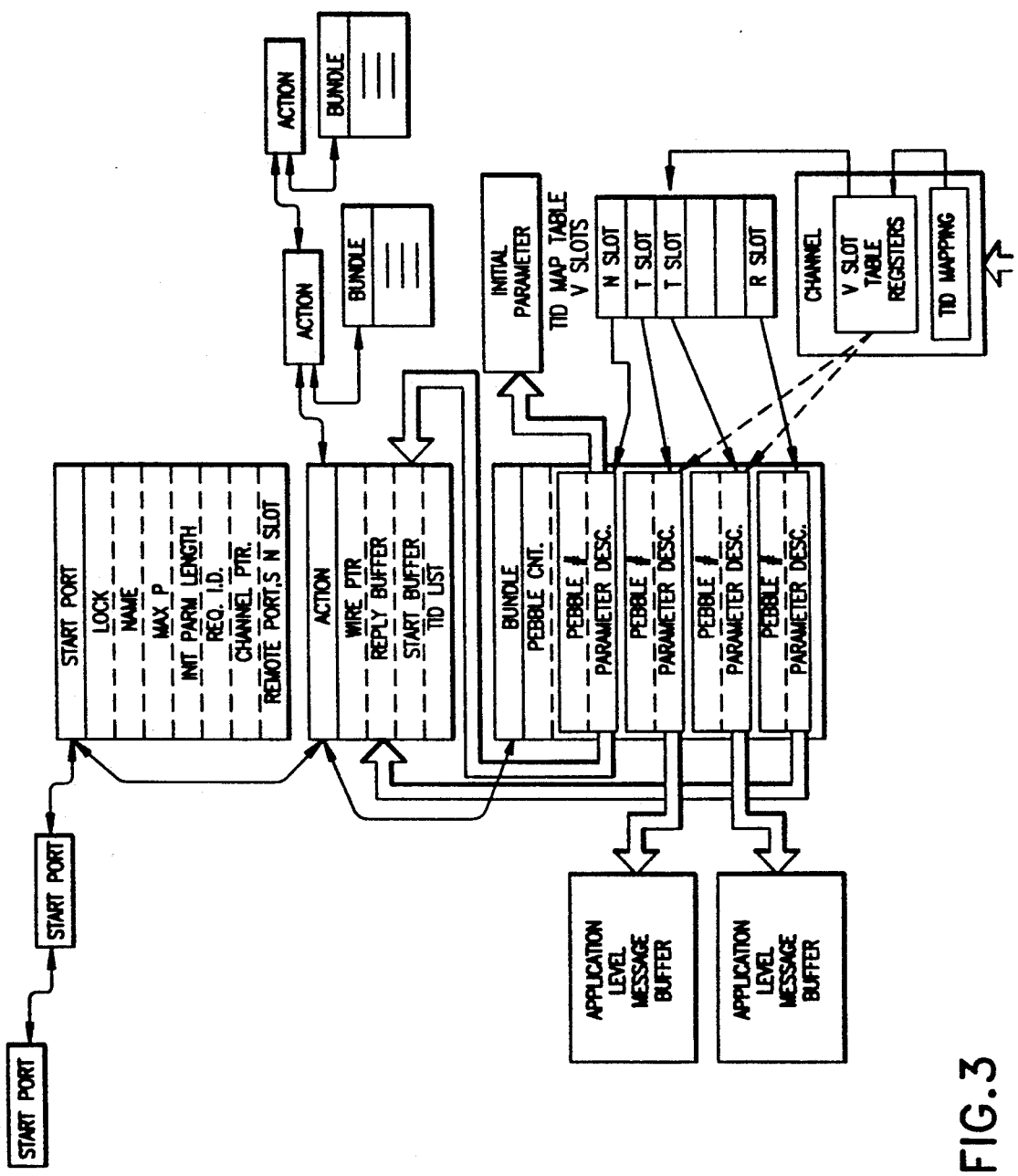
FIG. 3 is a block diagram of data structures formed in a client using the protocol of the present invention.

FIG. 3 illustrates the data structures formed in a client. A startport is formed in the client for containing the necessary information for the capability-based protocol to send actions to the node on which the serveport is located. The illustration of FIG. 3 only includes a few of the more critical portions of the startport. A number of startports are generally linked together to form a startport list. Each startport includes a lock which prevents the startport being used in an action from being used simultaneously by some other action, (i.e., a critical region). The startport includes a name provided by the client application which identifies that startport and matches the serveport name with which the client is connected. The maximum parameter count (MAXPCNT) relates to the number of messages which can be sent between a client and server. The parameters are the data which are sent in the messages over the bus. The initial parameter length (INITPARMLENGTH) identifies the size of the parameter which can be sent along with the start buffer in the start request. The request ID provides a name by which the client and server can refer to a particular action which is currently in progress. The request ID must be unique within a connection. In other words, no two active requests can be assigned the same request ID within ons connection. The request ID in the startport is used as a basis for the client capability-based protocol to generate unique request ID's for each of the actions. The request ID of an action is passed to the server within the start buffer. The channel pointer is used to access a data structure which describes the hardware channel used in the connection. Finally, the startport includes the remote port's N-slot, in other words, the TID which identifies the storage location for receiving the start buffer in the server.

When an action takes place between a client and a server, an action data structure gets involved. An action lives on both the client and server sides and contains the storage used for the start buffer. The action also contains the storage used for the reply buffer. Active actions are associated with a particular startport or serveport which represent the client or server. The action also stores the local node's TIDs for the parameters. The action also includes a wire pointer which is used only in the server side. A wire is a data structure which is used by the server capability-based protocol to control the incoming flow of start buffers. When the client protocol wants to start a new action, it sends a start buffer to the server. The server may or may not have a buffer ready to receive the start buffer which the client is trying to send. Start buffers are stored in actions which are not allocated until the server application does an accept operation. Since wires control the receipt of start buffers, every server n-slot is associated with wire. When an accept is done, an action is allocated, the action is assigned to a wire and a parameter descriptor is built which describes the buffer which will eventually hold a start buffer sent from a client.

A parameter descriptor is a capability which can be accessed by a TID. The parameter descriptor describes where in the computer's memory the parameter's buffer lives, providing the beginning storage location and its length. The parameter descriptor also includes an indication of the access rights which the other node has to the buffer's contents. In other words, whether the contents may be read and/or written to. The capability embodied in the parameter descriptor is executed and enforced by the channel processor 21.

In order to provide access from the bus to the parameter descriptors, a v-slot table referred to herein as a TID map table is used in the procedure of mapping a TID onto a parameter descriptor. Each channel connected to the message-based channel 10 includes a TID mapping function. A TID map cache may be used to provide direct access from the bus to a parameter descriptor. Since the cache is limited in size however, not all TIDs received over the bus are contained within the cache. Therefore, the TID map table may have to be used. The operation of the TID map table will be described in greater detail with respect to FIG. 4.

A bundle is a data structure which is identical on both the client and server sides. There is a pointer between an action and its bundle. The bundle is tightly associated with its action and together with a series of pebbles fully describes the operation in progress. The bundle contains the address of all of the pebbles needed for an operation and the operation's completion callback function and argument.

In accordance with the usage within this application, an action begins when the start buffer is accepted by the server and ends when the move and completion callback returns. In other words, on the client side from the start request until the start complete. On the other hand, an operation is defined as each individual move which occurs in between the beginning and end of an action. On the client side there is only one operation and that is the start operation. As shown in FIG. 2B on the server side, there are a series of move operations which can occur within the time in which a start operation is pending in the client. Each operation is described by a bundle, while each request is described by an action. Each request on the server side uses at least two bundles, one for the accept operation and one for the move end operation.

A pebble is a data structure which exists during operations. The pebble holds the parameter descriptor. In addition to the parameter descriptor, the pebble also contains other information relating to handling interrupts and errors which occur on its parameter. There is only one pebble for every TID in an action.

Figure 4:
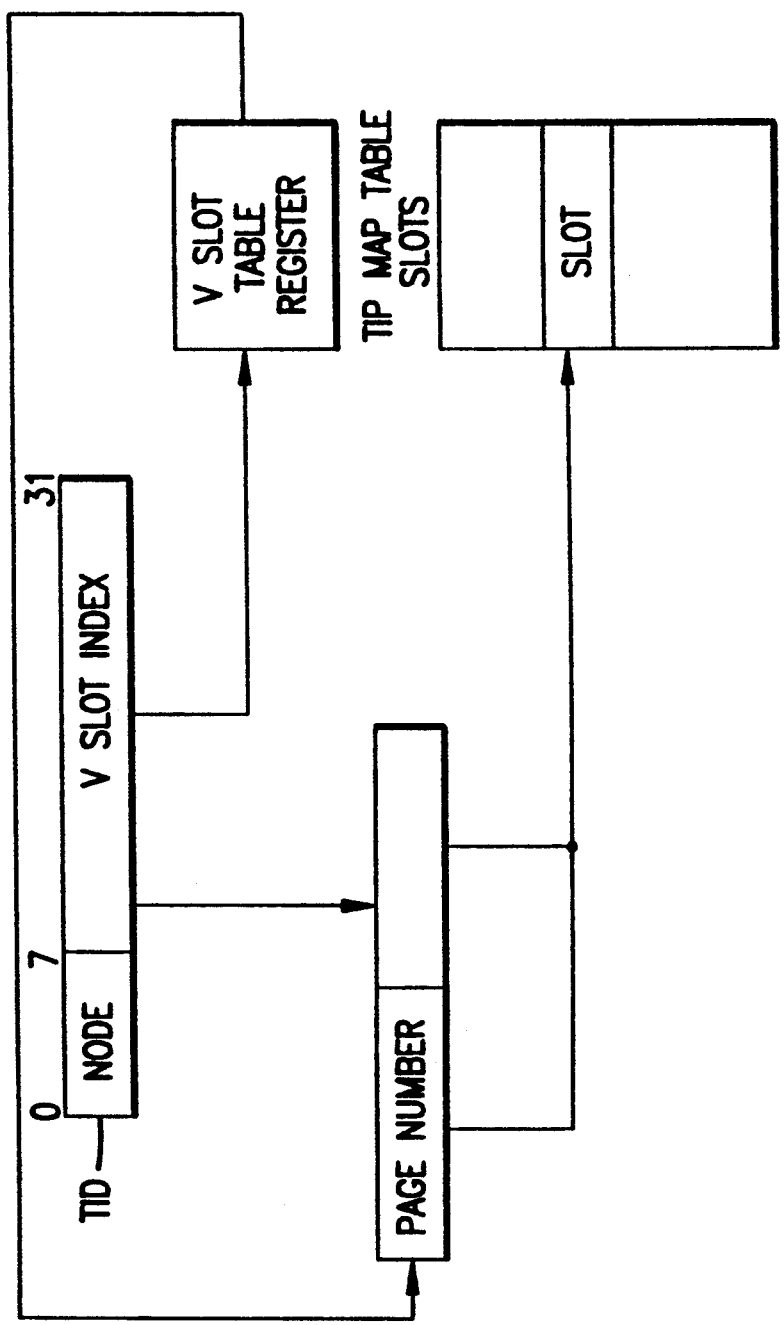
FIG. 4 is a block diagram illustrating the addressing performed by a TID.

Referring now to FIG. 4, one possible way of mapping a TID through the TID nap table is shown. The TID map table must be used whenever the TID map cache does not include the particular TID. A TID in accordance with the presently preferred embodiment is 32 bits long. The first eight bits identifies the node number. A latter portion of the TID provides a v-slot index. This is used to locate on a v-slot table register a page number for use in accessing the TID map table. The page number is combined with another portion of the TID to result in an index which identifies the appropriate v-slot in the TID map table. The v-slot contains a pointer to the appropriate parameter descriptor associated with the original TID. By providing a TID over the bus, access is immediately provided from the bus level to the parameter provided at the application level.

Figure 5:
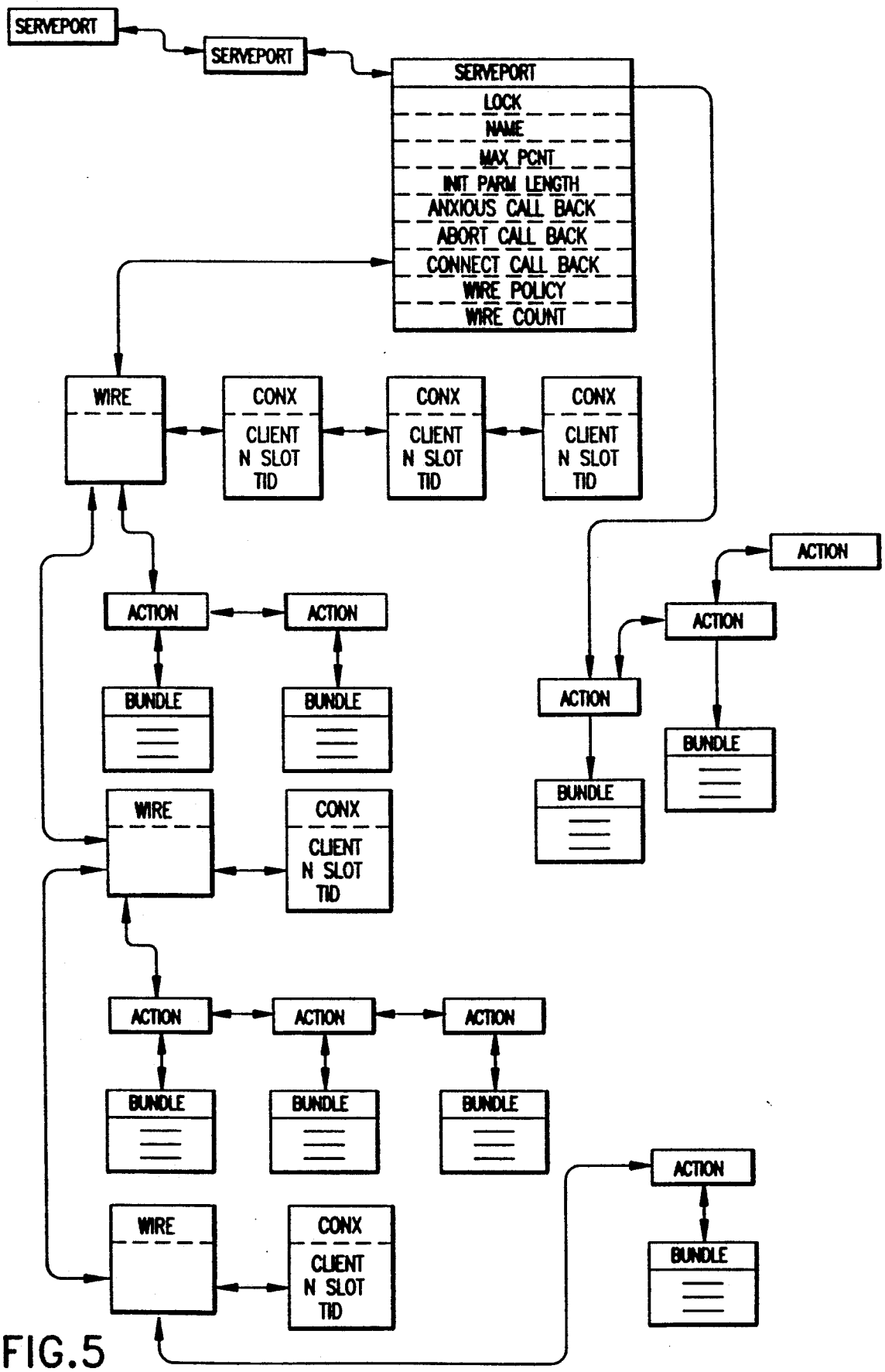
FIG. 5 is a block diagram of data structures formed in a server using the protocol of the present invention.

Referring now to FIG. 5, the data structures formed at the server side by the capability-based protocol are illustrated. Since the actions, bundles, pebbles and parameter descriptors and the use of the TID map table are similar in the server and client, that portion has been abbreviated in the FIG. 5. Start buffers waiting for the server application to complete an accept operation are stored in actions associated with the serveport. A serveport is quite similar to a startport. A series of serveports are connected together to form a serveport list. Just as in a startport, the serveport includes a lock, a name, the maximum pararaeter count and the initial parameter length. Some additional features of the serveport include a wire policy. The presently preferred embodiment of the present invention includes two wire policies, a shared policy and an exclusive policy. A server application chooses which policy it desires by passing an argument into the serveport when it is created. The policy only comes into play when there are multiple clients. Under the exclusive wire policy, each client gets a different wire and n-slot. Under the shared wire policy, all clients from a single channel share the same wire and n-slot.

The serveport also includes an anxious callback function. The anxious callback is a server application's subroutine which the capability-based protocol calls when a connection with a client goes "anxious". A connection goes anxious when a client tries to send a start buffer to a server and the server's n-slot has not yet been prized, in other words, the server's n-slot TID has not had a pointer inserted into the TID map table which would map the TID onto its parameter descriptor. This situation can happen when clients are generating requests faster than the server can process them. The server would then run out of buffers and cannot call the accept command until it has completed an earlier request to clear some buffer space. The server's capability-based protocol is informed of the failed attempt to transfer a start buffer by an interrupt called an "anxious interrupt". The server then marks the connection with that client as anxious and saves the interrupt information. The start buffer's transfer can then be resumed later when the server eventually does another accept. The server application is informed when one of his connections with a client goes anxious if he defined an anxious callback function when the serveport was created. If so, the capability-based protocol will call the server application's function when a connection goes anxious. The server application may use this callback to try to allocate more memory for a new accept, for example. The opposite case, where the server issues more accepts than he has wires, is also possible. When this occurs, the extra actions are listed off the serveport.

The serveport also includes space for an abort callback and a connect callback. The abort callback informs the server application when a client aborts an existing request. The connect callback is used to inform the server when a client either connects or disconnects.

The serveport includes a pointer to the wires which support the connections made between the clients and the serveport. The wire count is included in the serveport indicating the number of wires that exist on this serveport. Each wire is provided with a list of actions which are active on that wire. The wire is used by the server to control the incoming flow of start buffers. When the client wants to start a new action, it sends a start buffer to the server. The server may or may not have a buffer ready to receive the start buffer. Start buffers are stored in actions which are not allocated until the server does an accept command. Since wires control the receipt of start buffers, every server n-slot is associated with a wire. When an accept is done and an action is allocated, the action is assigned to a wire. The wire is provided with a chain of all of the actions which have been assigned to it.

A conx is an internal data structure which only exists in the server side. The conx is used when the connection between the server and a client goes anxious. When the clients' attempt to send a start buffer to the server fails because there is no buffer to hold the start buffer, the channel generates an anxious interrupt which contains the information necessary to resume the bus transfer at a later time. This information includes primarily the clients n-slot TID from which the start buffer is being sent. The clients n-slot TID is stored in the conx and the conx is then placed on the wire data structure so that when the server application issues an accept, the serving protocol can find the connection which has gone anxious. The bus transaction can be resumed using the information in the conx and the action provided by the newly issued accept. Conx's are also used to track which client nodes are connected to a particular server.

In order to be prepared to receive and send messages over the bus, a server which may be a disc, a tape controller, a host, etc. will create a serveport. A connect request may be made when application programs running on a client node sends messages through the channel to a special port used by the capability based protocol on the server which indicates to the protocol the need for the creation of additional connections. The create serveport request has a number of arguments associated with it. The serveport must be given a name. The name identifies the application which will use the serveport and identifies the particular server in which the serveport is being created. The name also specifies the particular high level protocol which defines the communication between the client and the server. Each application program requires a different amount of memory space, thus, along with the name is provided the maximum parameter count (MAX PARM COUNT) and the maximum initial parameter size (MAX INIT PARM SIZE) arguments. One parameter may be sent from client to server along with the start buffer and this parameter is called the initial parameter. The MAX INIT PARM SIZE argument sets the amount of memory needed to accommodate the initial parameter, if there is one.

Create serveport is also provided a wire policy argument. The wire policy argument of the presently preferred embodiment, selects one of the two available wire policies. In the shared wire policy, each channel connected to the server is entitled to one N-slot and one wire. In accordance with the second permissible policy, the exclusive wire policy, each client which may communicate with the server is entitled to a wire and an n-slot. This second policy would be appropriate for a server that has an abundance of memory space.

The create serveport request can also include arguments which describe a number of callback functions. One such function is an anxious function. The create serveport instruction passes the address of the routine for performing the anxious function. The purpose of the anxious function is that it be called whenever the server lacks enough buffer space to accept a start buffer sent by one of its clients. The anxious function takes appropriate action if possible in response to being alerted to that condition. A second available callback function is the connect callback. This function tells the server when a client has connected or disconnected. A third available callback function is the abort callback which tells the server that the client does not need a particular action completed successfully. Upon completion of the create function, the transaction protocol provides the serveport ID which identifies the newly created serveport to the calling application in the server module.

Figure 6:
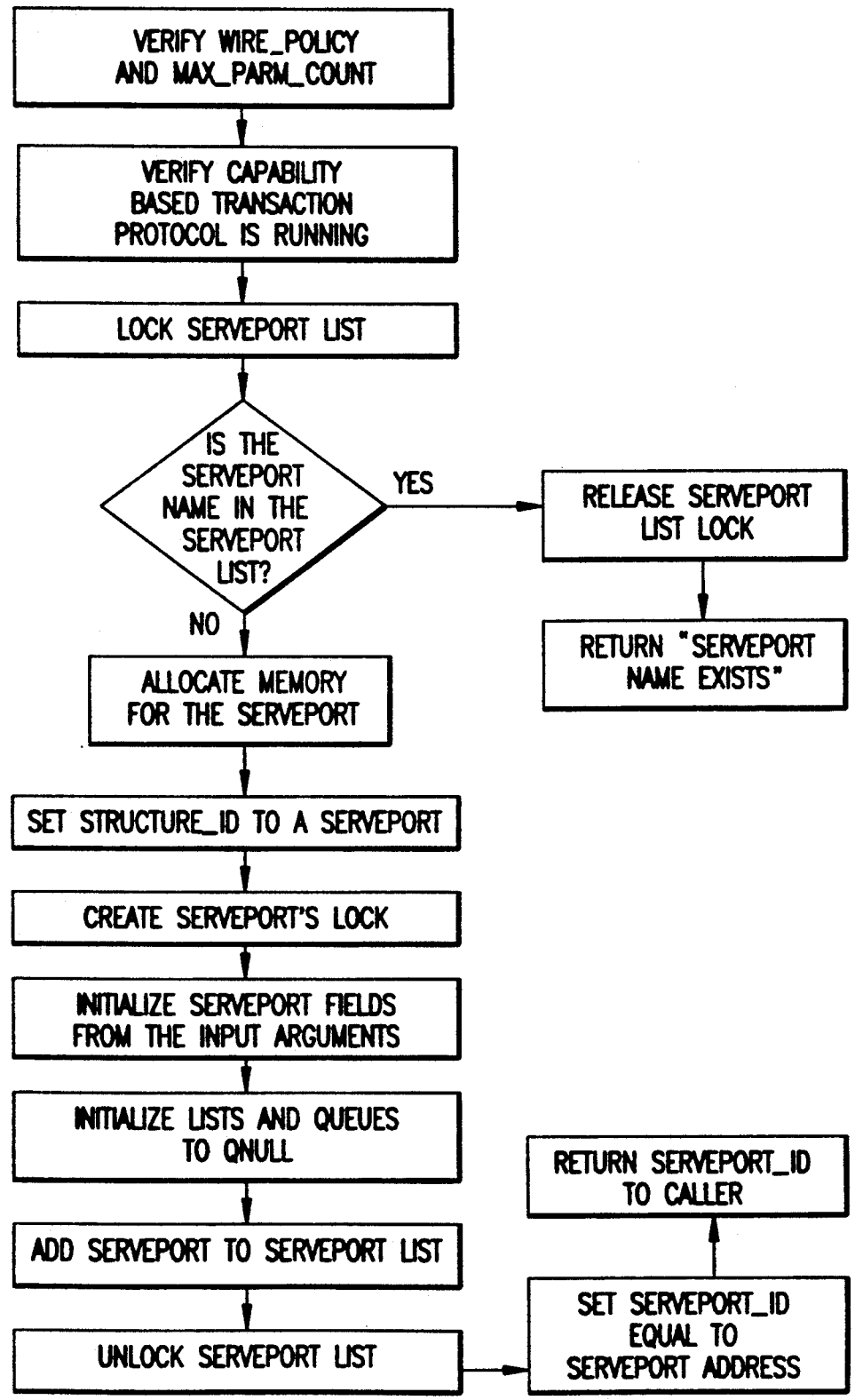
FIG. 6 is a flow chart of a CREATE SERVEPORT request for use on the system of FIG. 1.

Referring now to the flow chart on FIG. 6, the create function is shown in greater detail as a flow chart. First, the wire policy is checked to make sure that it is one of the two possible policies. The maximum parameter count is also checked to insure that it does not exceed a legal limit. The next procedure verifies that the capability-based interface layer has been booted up and is running. If any of these checks fail, create will return an error explaining what was invalid. On the other hand, if everything is in order, the create function will proceed to lock the serveport list. This is a list of serveport names which have been created in the server.

The serveport name identifies the device or host which is providing a service. The serveport name has two portions. One portion may be used generally to identify the type of device or host-based application. This portion identifies the application protocol which will be used by the data and server application programs. This identification is a number which is administered to guarantee uniqueness. For example, there may be one registered identification number used to identify a particular type of IO disc, a particular type of IO tape or a host application program. The remainder of the serveport name is defined according to the rules of the application protocols. For example, it may be used to distinguish from among a number of different IO discs which are all connected into the same message-based bus 10 through a device controller 16. Or in the case of host applications, the serveport name distinguishes from a number of different message receiving ports in the server application. If the serveport name already exists in the serveport list, then there is no need to go forward with the create. Therefore, the serveport list lock is released and the calling program is informed that the serveport name exists.

In going forward with the create, memory space is allocated for a data structure called the serveport. A data structure such as a serveport are each given a structure ID which identifies the type of data structure that it is. Therefore, the structure ID in the memory allocated to the serveport is set to identify this structure as a serveport. A lock is then created for the serveport. Functions which were input when the create function was called, max parm count, max init parm size, anxious callback, connect callback, abort callback, wire policy are inserted into their respective locations in the serveport data structure. The remaining memory locations allocated to the serveport are initialized by setting them to zero, or QNULL. QNULL sets all bits in the designated areas to 1's. Now the serveport may be added to the serveport list. The serveport list is then unlocked. Serveport ID is set equal to the address for the newly created serveport. This serveport ID is returned to the calling program.

Once the server has created a serveport, it is possible for a client to connect with that serveport so that communications may be established between the client and the server. A client performs a connect command to establish a connection with a server. The application program in the client calls the transaction protocol layer's connect command passing the serveport name and the server nods number as arguments. The serveport name is known to the higher level programming in the client just as it was known to the higher level program in the server which made the create command in the first place. The server node may be determined by the client in a variety of ways. It may be provided by a configuration management utility run on the bus controller 14 or any host system. The client may also poll each node on the message-based bus 10 until a connection is successfully established.

An alternative method for a client to identify its server is by receiving an announce instruction. An announce message can be sent from a server to a node which it believes may have potential clients. The announce request includes the serveport name and server node number, in case the server is on a different (third) node. The transaction protocol layer at the receiving node can reply either that the announce was caught (there is a client), that it will be held should a client be started later, or that it has been dropped (future clients will not know of the announcement).

Figure 7A:
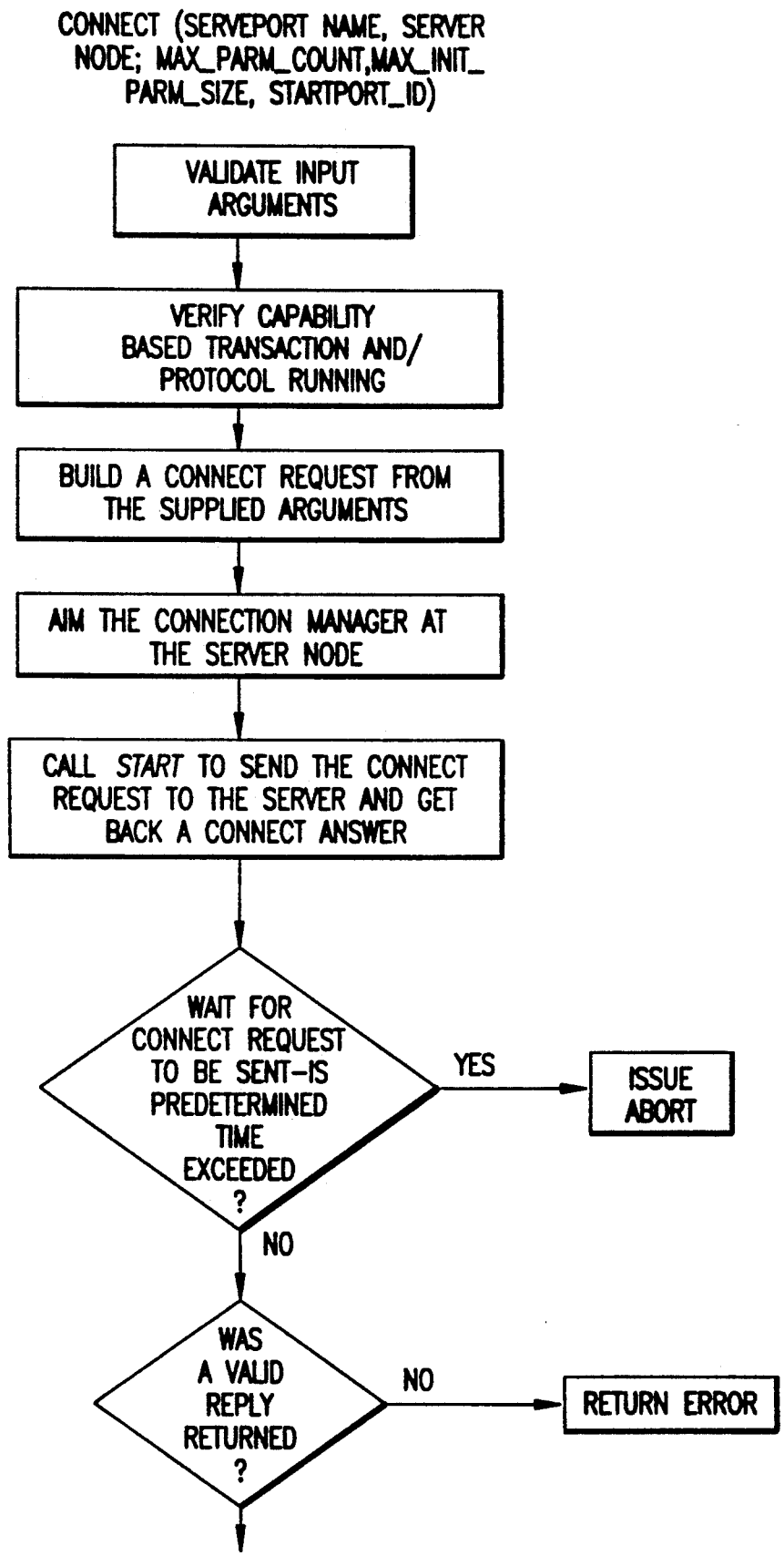
FIGS. 7a and 7b is a flow chart of a CONNECT request for use in the capability-based protocol for the system of FIG. 1.
Figure 7B:
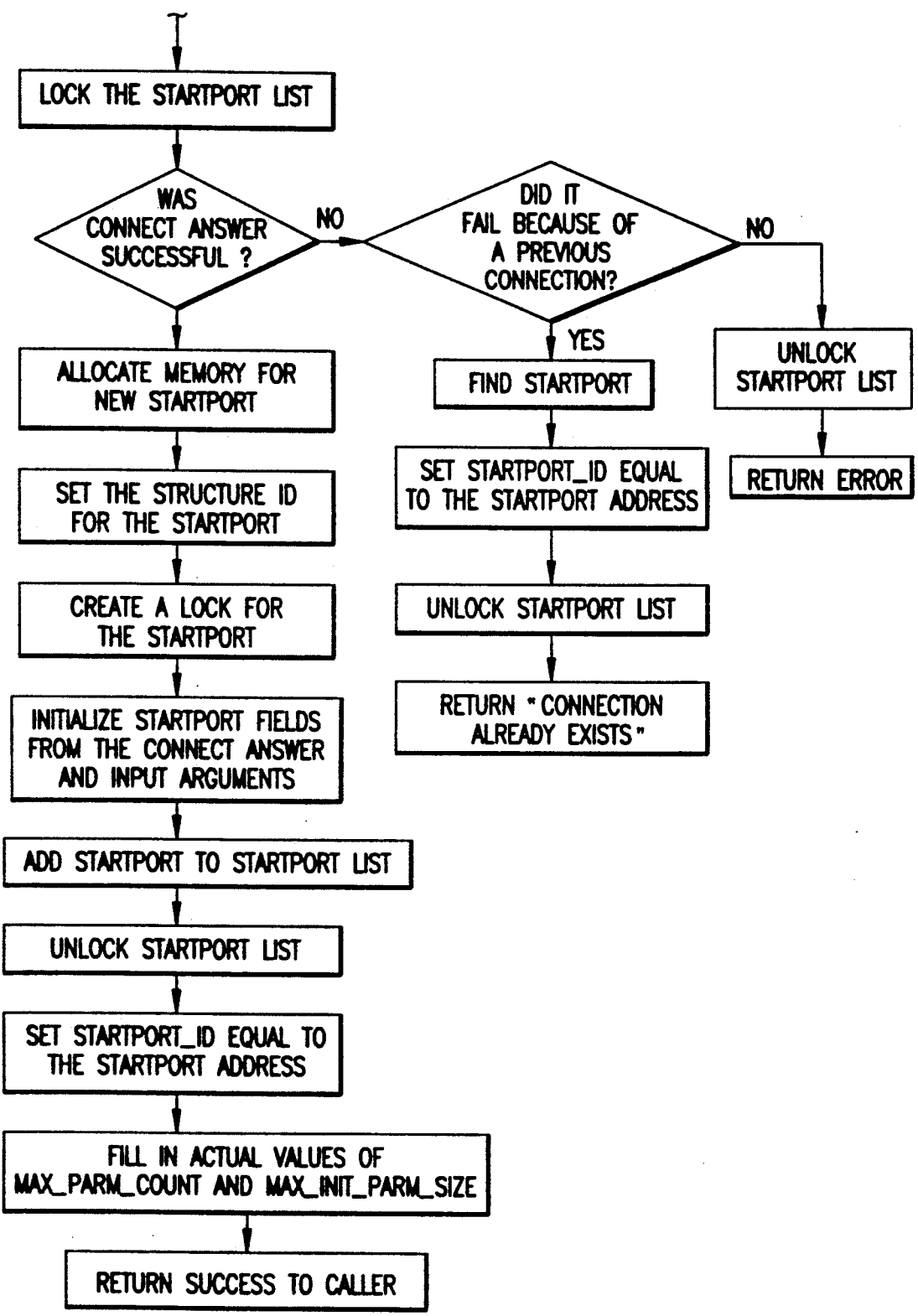

The first illustrated step of FIGS. 7a and 7b in performing a connect command is to validate its input arguments. Having determined that the server node is within the chassis, the program checks to insure that the transaction protocol has been booted up and is running. An appropriate connect request is built from the serveport name and server node.

Every module contains a software process identified as the connection manager. An interesting feature of the present invention is that the capability-based transaction protocol includes the connection manager and that the connection manager makes independent use of the protocol itself. The connection manager in each module is at a serveport with a predefined name. For simplicity, the serveport for the connection manager of every node is given the serveport name 0 and is given 0 as its N-slot TID. Thus, TID 0 is always one of the available TIDs supported by each module's interface hardware. The connection manager is used to effect connections or disrupt connections. After constructing the connect request, which is a message within the capability-based protocol of the present invention, the client's connect function locks its own startport and aims it at the potential server's node. This will prepare the connection manager in the client to send a connect request message to the connection manager in the particular server node with which this client application wishes to make a connection.

Next, the start command is called in order to send the connect request to the connection manager at the designated server node and in order to get back the connect answer from that connection manager. The start request will be described in more detail in connection with FIGS. 10a, 10b and 10c below. Briefly, the start request sends a start buffer and an initial parameter to its server destination. In this instance, the initial parameter will contain the connect request. The start buffer would include a TID which identifies a memory space in the client which will be used to receive the connect answer. The operation of the connection manager will be discussed below in connection with FIG. 8.

A client waits for the connect request to be sent out by its bus interface hardware. If the request is properly sent, the client waits to receive a reply. If a predetermined time is exceeded an abort is issued. If a valid reply is not returned, the connection manager startport is unlocked and an error message is returned to the connect request caller indicating the connect request could not be satisfied. If a valid reply has been returned, it is known that the connect request was successful.

Once the connect has been made, a client will need to use a general purpose startport for sending out start buffers through the newly created connection. Thus, the next step is to lock the startport list within the client. The next step is to check to see if the connect request was successful. If the server's reply indicates there was already a connection, the next step would be to locate the startport which apparently already exists. If the startport cannot be found then there is an obvious error. Once the startport is found its pointer will be returned to the client application as the startport ID. Then the startport list can be unlocked and a message is returned indicating that the connection already exists.

If the connect request was unsuccessful for some reason other than the connection already existed then there has been an error. The startport list is unlocked and the error is returned indicating that there has been an error.

If the connect request is successful, a new startport will have to be set up. Memory space is allocated for the new startport. A lock is created for the startport. The startport fields are initialized using the serveport name and server node from the input arguments to the connect command and using parameters received back from the connect answer. The connect answer is another message defined by the capability-based protocol, and was created by the connection manager of the server. The connect request answer includes among other things, the server n-slot TID where the client will send its start buffer. The new startport is added to the startport list. The startport ID is set equal to the new startport address. One of the arguments received from the connect answer are the maximum parameter count (max parm count). Each parameter is a data field or array. The other argument received from the connect answer is the maximum initial parameter size. The same bus transfer packet which delivers the start buffer may also deliver a single data field or array in what is called the initial parameter. The maximum size of that initial parameter is specified by max init parm size. Both of these values were determined when the server application created the serveport. These values are returned to the caller of the connect command when success of the command is indicated.

Figure 8:
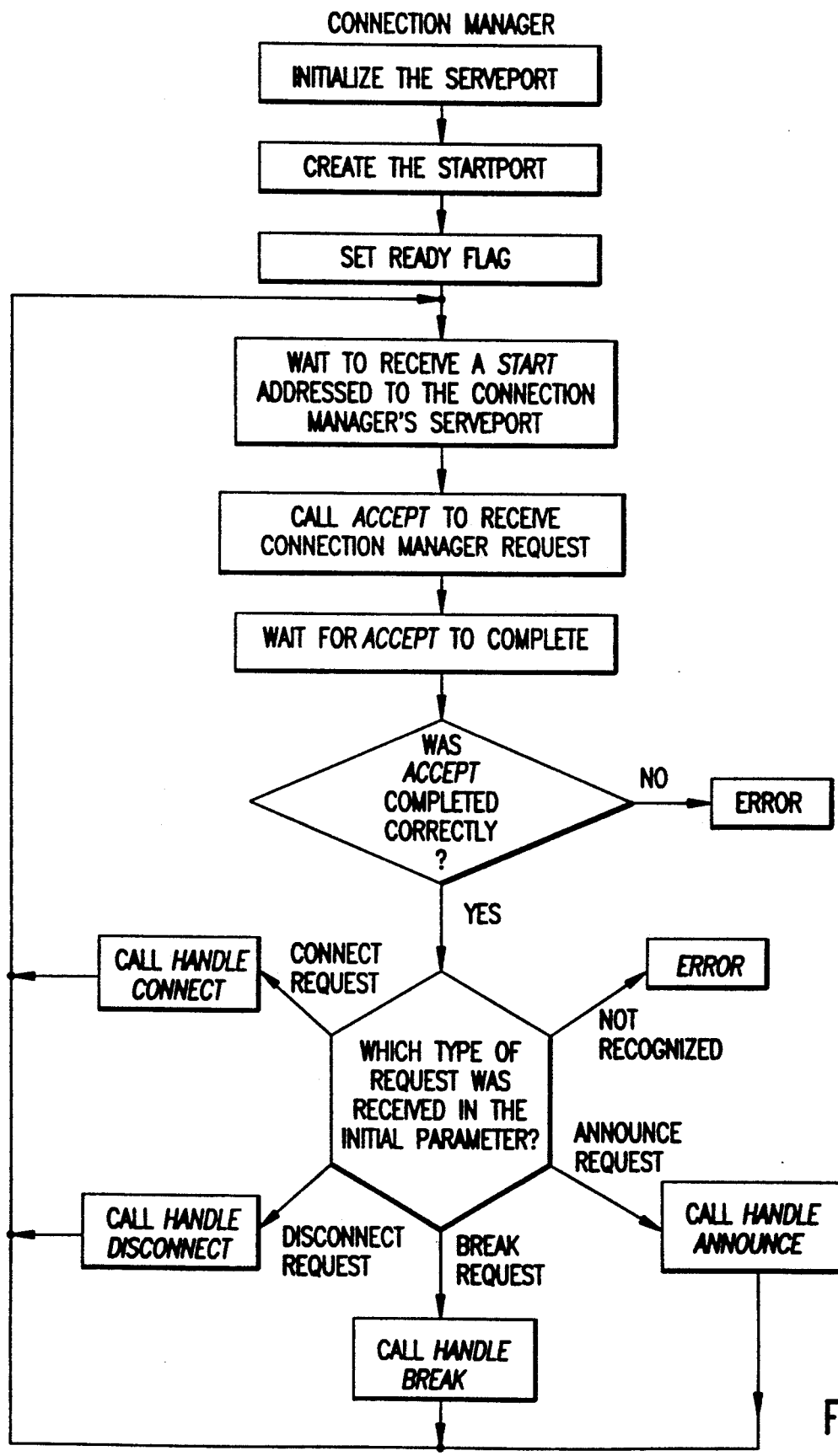
FIG. 8 is a flow chart for a connection manager found in each node in the system of FIG. 1.

The connection manager which was used in the connect command is flow charted in FIG. 8. The connection manager is an independent program embedded in the capability-based transaction protocol layer. The connection manager itself is treated separately as both a client or server. In booting up a system, the connection manager initializes its serveport. As stated above, the serveport for the connection manager is at a predetermined location known to all modules. For convenience, the serveport has the serveport name 0 and is located by using TID 0 to identify the serveport for a connection manager.

When the connection manager is called on to act as a client, it will need a startport. Thus, the next step in booting up the connection manager is to create the connection manager's startport. When both the serveport and startport are successfully created, a flag is set to indicate that the transaction protocol layer is ready. The connection manager then awaits the receipt of a start command addressed to its serveport. This would occur, for instance, in the execution of a connect command as discussed above with respect to FIGS. 7a and 7b.

If desired, the connection manager can be notified when a start command is received via the connection manager serveport's anxious callback.

Upon activation, the connection manager performs an accept. The accept command will be discussed below in connection with FIG. 11. The accept readies the hardware in the connection manager's module for transferring the start buffer into an action associated with the connection manger's serveport. Once the accept has been completed correctly, the connection manager looks at the initial parameter transferred with the start buffer to determine which type of request is being invoked. The initial parameter will contain one of the messages defined by the transaction protocol layer. In the case of a connect command, it will be a connect request. As such, the connection manager will call its handle connect routine described herein in connection with FIGS. 9a and 9b. If the request is a disconnect request, connection manager will call its handle disconnect routine discussed below. Disconnects are initiated by a client to remove a connection. If the request is a break request then the connection manager will call its handle break routine. A break is a command issued by a server wishing to disrupt a connection with a client. If the request is an announce request, the connection manager will call a handle announce request. If the request is not recognized as one of these four, there is an error which would need to be returned to the node which issued the request.

Figure 9A:
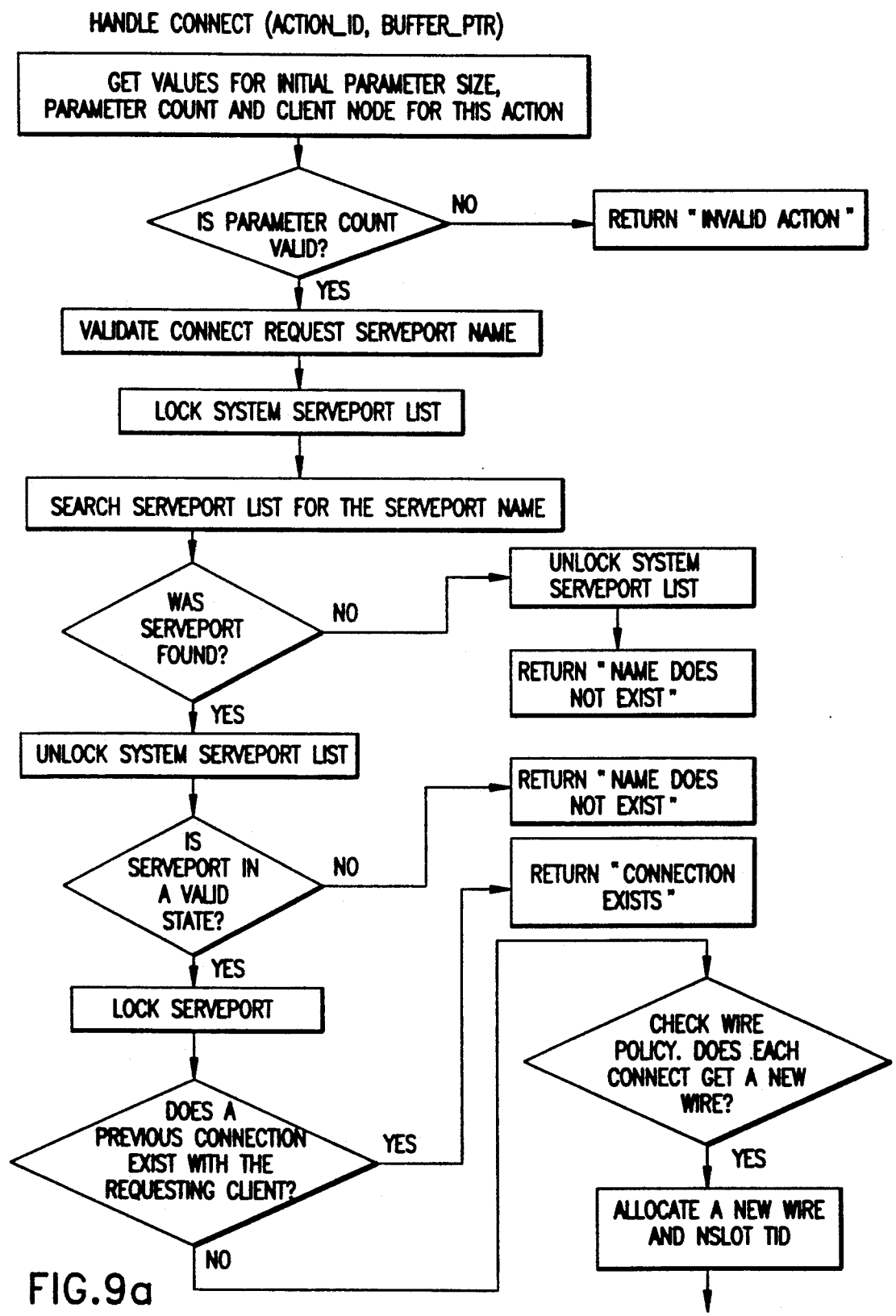
FIGS. 9a and 9b is a flow chart of a HANDLE CONNECT routine which may be called by the chart in FIG. 8
Figure 9B:
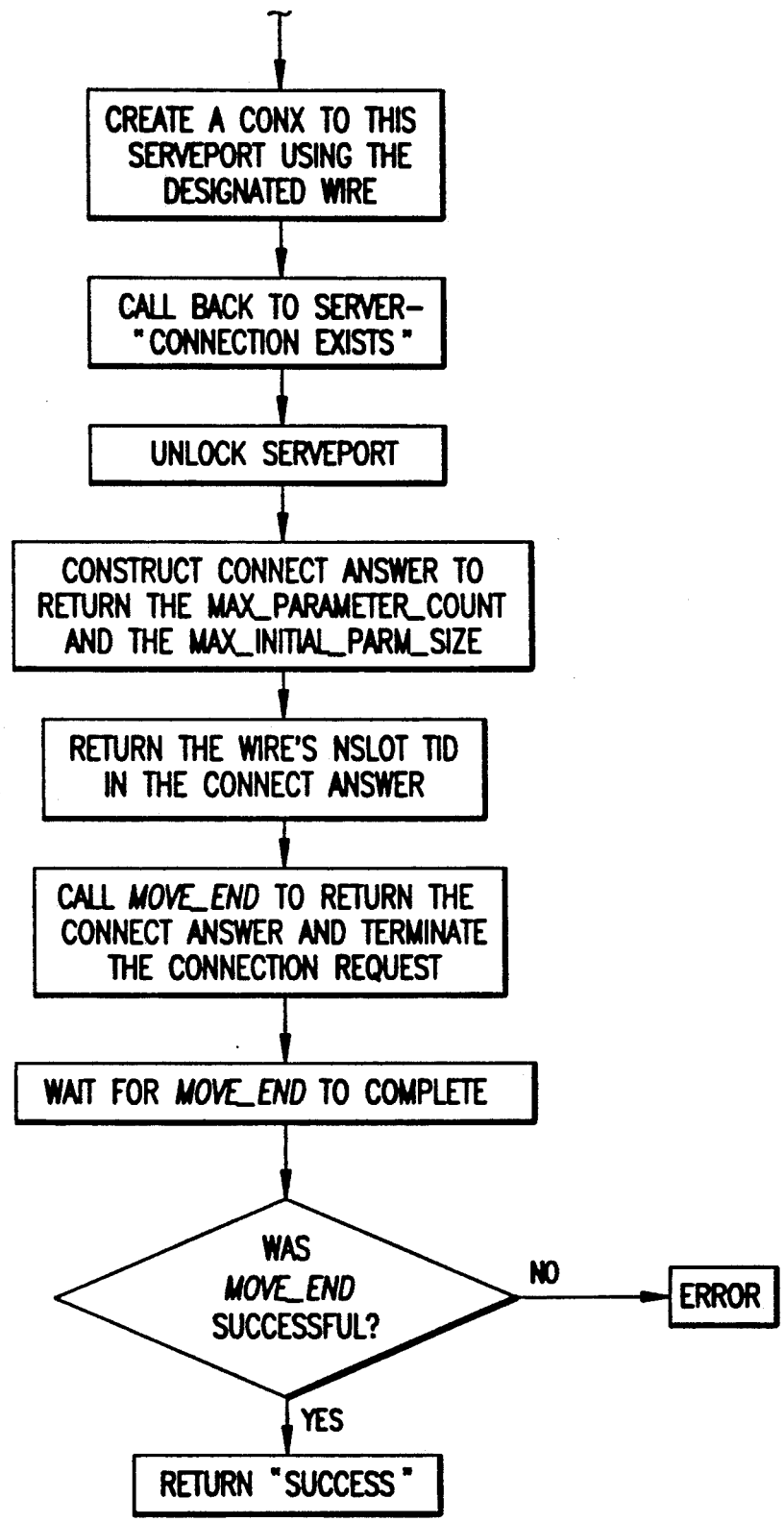

Referring now to FIGS. 9a and 9b, the handle connect routine is flow charted. Passed along with the handle connect request is the action ID which was determined by the accept command and a buffer pointer which identifies the location of the initial parameter which now contains the connect request sent by the potential client node. The buffer pointer identifies where the initial parameter was stored after the accept was completed. The action set up by the accept command is a data structure including this request's initial parameter size, number of parameters in this particular client request and the client's node number. All of this information is contained in the start buffer received by the connection manager's node. The client nods identifies which module the start command came from. Since the number of parameters or parameter count for a start command for the connection manager is a maximum of one, if it exceeds that number the parameter count is invalid. The only parameter passed with the start buffer is the initial parameter. If the parameter count is invalid, an invalid action message is returned in the connection answer to the requesting node.

The connect request will identify the name of the serveport the client node wishes to connect to. This name is validated by making sure that the name is not all 0's, since all 0's would specify the connection manager port. Once validated, the system serveport list is locked and the serveport list can be searched to locate the serveport name which is the subject of the connection request.

If the serveport name cannot be found in the list, the serveport list is unlocked and a connection answer reply is returned indicating that the name does not exist. In other words, the server had not yet performed a create command for the serveport identified in the connect request.

If the serveport name is found on the list the serveport list can be unlocked. The target serveport is locked and checked to make sure that it is in a valid state. This makes sure that the serveport is not in the process of being destroyed. Thus, if the serveport is not in a valid state, then the answer that the serveport name does not exist is returned. The conx's associated with the designated serveport are reviewed to determine whether a previous connection already exists with the requesting client. If such a connection exists, then that message will be returned. Otherwise, a new connection must be made.

The wire policy for the serveport was set during the create command when the serveport was created. As previously discussed, the presently preferred embodiment provides for two different wire policies. One is the exclusive policy in which each connection gets its own wire. The other policy is the shared policy in which there is only one wire per channel connected to the serveport. When a new wire is needed, it is created by allocating memory to hold a wire data structure. A server N-slot TID is also allocated and stored in the wire. The N-slot TID is the bus address of the storage location which will receive a start buffer when one is received using this newly created wire. A wire is a data structure which contains a structure ID identifying it as a wire, a back pointer pointing to the serveport to which the wire is connected and the wire's N-slot TID. Other parameters, such as a list of actions using the wire, may be included in the wire as desired by the system designer. The main purpose of the wire is to identify the server's N-slot for a specific wire on a serveport. It also stores lists of conx structure, as follows.

After the wire is created, it is used to create a data structure called a conx. If a new wire was not created, a conx is attached to an existing wire. The conx data structure represents an individual connection between the server and the client. The conx data structure includes a pointer to the wire being used for the connection, a flag to indicate whether the connection is in the process of being broken, the client node number, and the client's N-slot TID. The conx is also used when a client tries to send a start buffer but the server has not yet performed an accept to provide a place for that buffer. After creating the conx, the connection manager does a connect callback telling its server application that the connection exists. The serveport is unlocked and a connect answer is constructed. The connect answer is formed as a parameter which will be sent using a move end command. The move end command is used for replying to a client's request and will be described in further detail below. Included in the connect answer is the maximum parameter count and the maximum initial parameter size for the serveport. These are set for the serveport during the create command. Also included in the connect answer is the server N-slot TID for the wire. Move end is called to return the connect answer and terminate the connection request with either a successful or error reply status. The connection manager waits for the move end to complete and checks to see whether the move end was successful. If not, an error has occurred. If the move end was successful, success is returned to the connection manager.

Figure 10A:
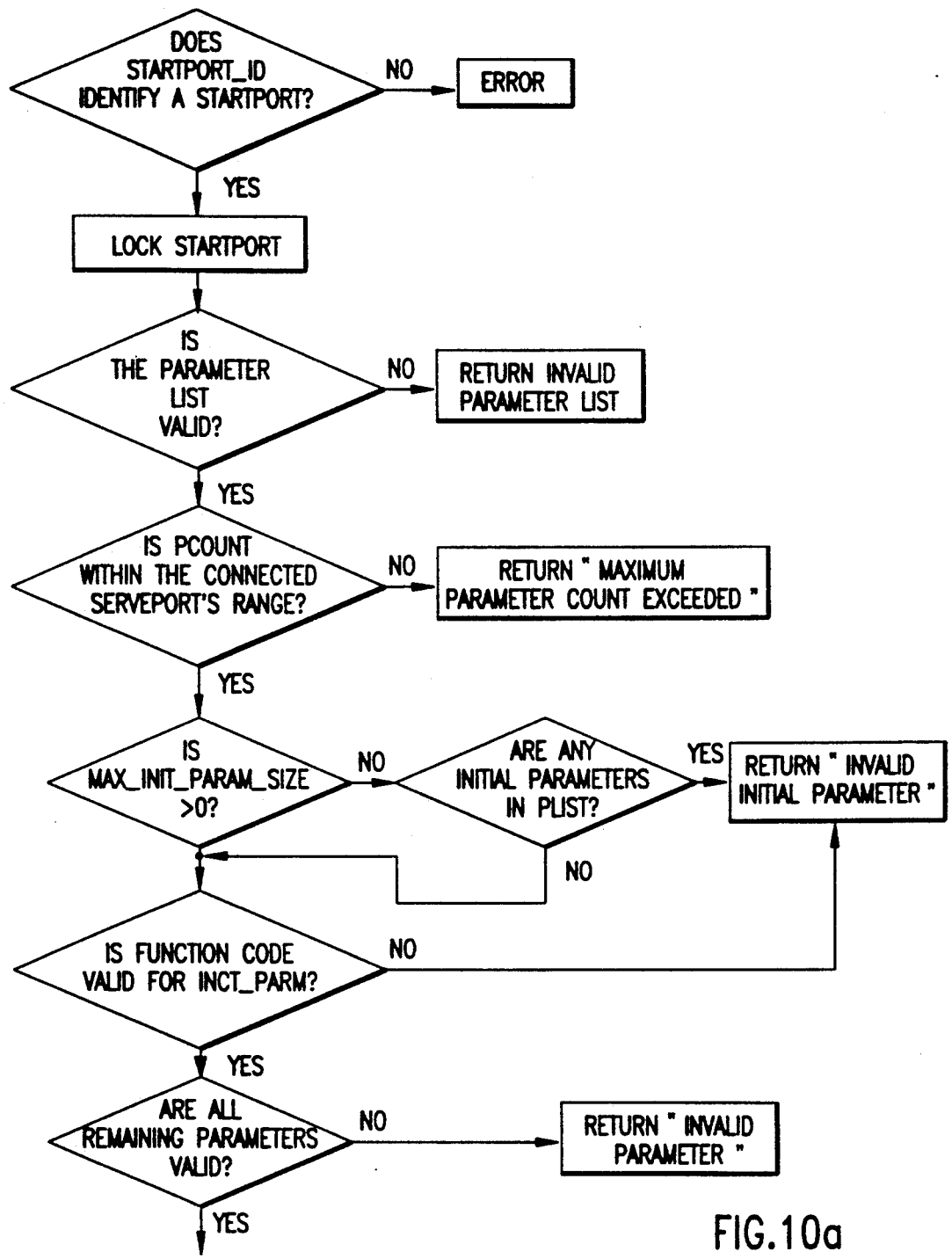
FIGS. 10a, 10b and 10c is a flow chart of a START request which is used in the capability-based protocol for the system of FIG. 1.
Figure 10B:
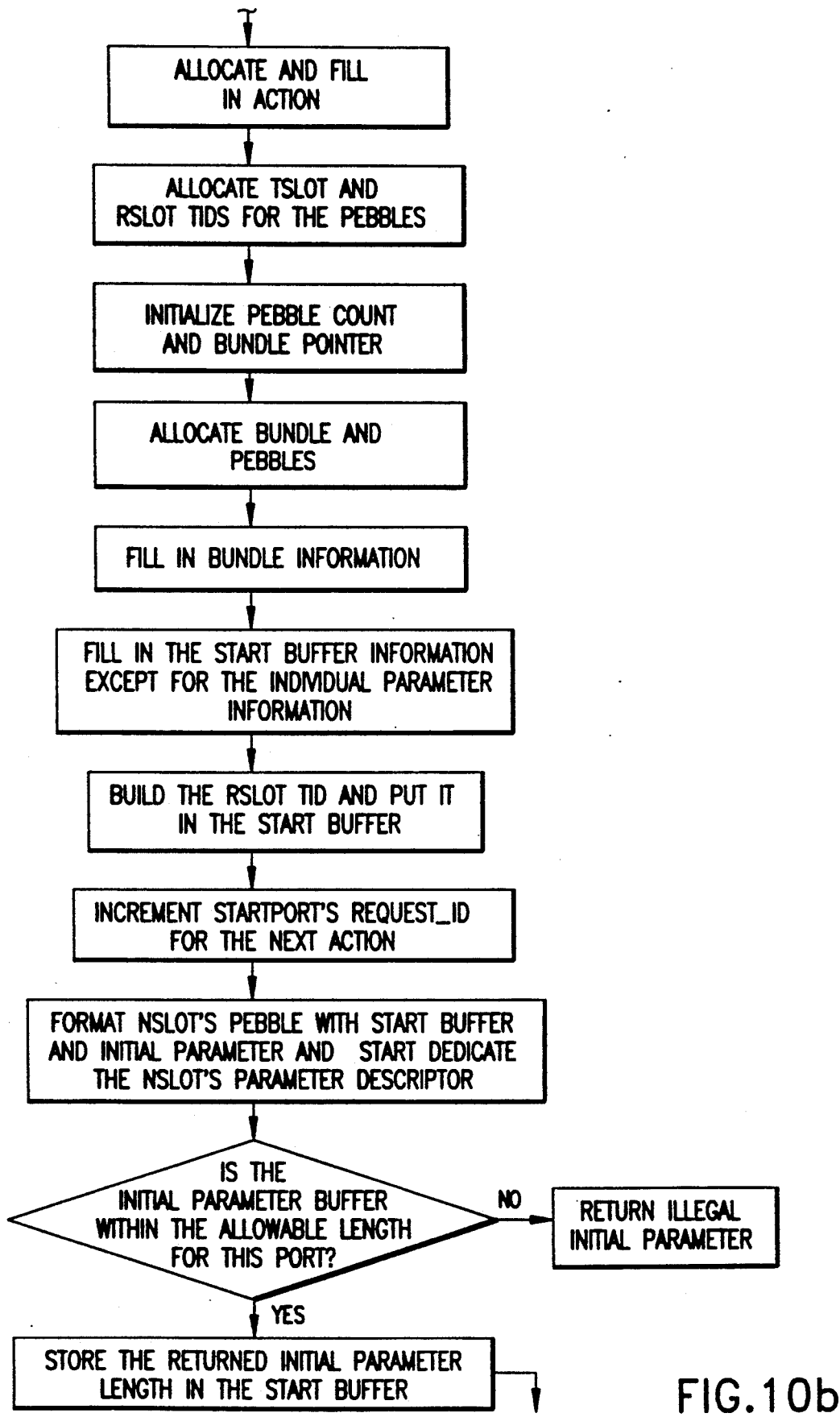
Figure 10C:
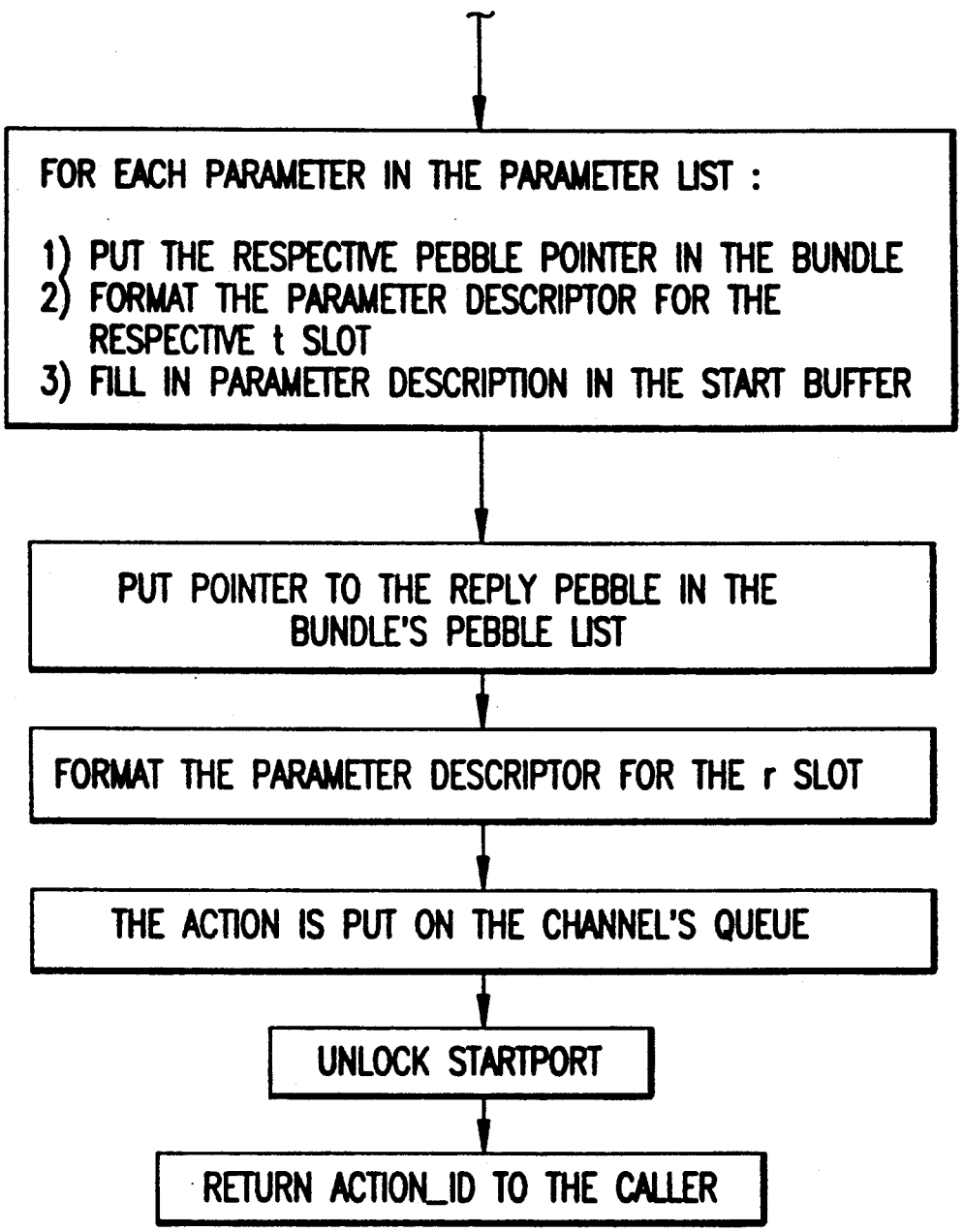

Once the connection has been set up between a client and a server, communications can be initiated by the client sending out a start command. This will cause the transaction protocol layer to send a start buffer and optional initial parameter from a startport in the client to the N-slot TID in the server. Referring now to FIGS. 10a, 10b and 10c, the flow chart for the start command is illustrated. Input as arguments to the start command is a startport ID giving the address for the client's startport, a parameter count which also indicates whether or not an initial parameter is being passed, a parameter list identifying all parameter's which exist and a start complete callback function and argument. The callback function will provide the client with the information as to the results of the start command's completion. First, the supplied arguments including the startport ID parameter list and parameter count are verified to be valid. The startport is locked. In order to determine whether the server's N-slot will accept an initial parameter, the protocol layer checks whether the maximum initial parameter size is greater than 0. If it isn't, there is no initial parameter permitted, therefore, if there are any initial parameters in the parameter list a message is returned indicating that there is an invalid initial parameter. If an initial parameter is permitted, the size of the supplied initial parameter is verified to make sure it is less than or equal to the max init parm size.

Each parameter is provided with a function code which tells in which direction(s) the parameter travels. For an initial parameter, it must go from a client to a server. This function code is checked on the initial parameter if there is one, and if the code is in a wrong direction, the invalid initial parameter message will be returned. The initial parameter may only be transferred once, while the remaining parameters may be transferred multiple times if desired. The remaining parameters are also checked to make sure that their directions are valid. The function code issued is used to determine the access rights the server node is allowed. The access rights are identified by and enforced by the TID. If an invalid parameter is indicated, a message to that effect will be returned.

The protocol layer is then ready to allocate and fill in an action. An action is a data structure which will last from the start until there is a move end from the server. The action, like all other data structures, includes a structure ID which identifies it as an action. There is a back pointer from the action to the startport or serveport that the action is associated with. A wire pointer identifies the wire, on the serving side only, over which this start command was received. There is a pointer to a bundle. The bundle identifies an operation while it is in progress. Individually, each parameter is provided a data structure called a pebble. All of the pebbles are listed in the bundle data structure. The action stores a list of all the TIDs for each parameter plus the reply buffer's reslot TID. The action also includes the start buffer itself and storage location for the reply buffer when it is returned in the move end command.

Each parameter except the initial parameter is allocated a T-slot TID which identifies a storage location for that parameter. A T-slot TID is an address on the message based bus 10 which can be translated by a node interface into the memory address of a client-server parameter. Each parameter is described by a parameter descriptor in a pebble. In addition, a reply pebble is provided for receiving the reply buffer during the move end operation. The reply buffer receives an Reslot TID within the action. A Reslot TID is an address on the message based bus 10 which can be translated by a node interface into the memory address of a reply buffer. By providing all of the pebbles with TIDS, the client has become prepared to receive or send data responsive to each of the parameters identified in the start buffer being sent to the server. When the server is prepared to return data, it will be directed to the appropriate storage location. Because of the TID based capability, the server will only be allowed to access parameters according to the desires of the client application's T-slot TID or the protocol layer's N-slot or Reslot TIDS.

The pebble count is initialized at the parameter count plus one. The bundle pointer is in the action and points to the bundle data structure. Storage space is allocated for the bundle and the pebbles. The bundle data structure is filled in. The bundle includes a structure ID identifying that structure as a bundle, a bundle type is included which identifies the bundle as related to a start action, a pebble count gives the number of pebbles, the callback function and argument is stored in the bundle, a back pointer to the action structure is provided and a list of the pebbles is included.

The start buffer information within the action is filled in except for the individual parameter information. A start buffer is defined by the capability-based protocol and will be sent out over the bus to the server. The start buffer includes a portion identifying it as a start buffer, an indication of the length of the buffer, the parameter count, the request ID (a number which uniquely identifies this request from any other requests between the client and server), the Reslot TID for the reply buffer indicating to the server where to return the reply buffer to, and the initial parameter length. A description of each of the parameters will be added at a later time in the program. The startport's request ID is incremented for the next action which is started with this startport.

Next, the N-slot's pebble is formatted so it will send the start buffer and initial parameter to the server's N-slot. The parameter descriptor is set up to describe the memory locations for the start buffer and initial parameter, and its access rights are formatted to be start dedicated with read only access. After formatting, the tid map table is updated so the N-slot tid can be mapped to the parameter descriptor.

The initial parameter supplied by the caller of the start operation is checked to make sure that it is within the allowed length for the serveport to which it is being sent. If the initial parameter buffer exceeds the allowed length, the program returns an illegal initial parameter message. If the length of the initial parameter suppled by the caller is allowable, that length is then stored in the start buffer.

Next, for each parameter in the parameter list its respective pebble pointer is put into the bundle and a TID is allocated. The parameter descriptor within the T-slot's pebble is formatted based on the parameter's function code provided by the client application. Each T-slot is nods dedicated so that the hardware allows only data packets coming to or from the server node involved in the present action. The parameter's description is then filled into the start buffer. The description includes the parameter's length and its T-slot TID. The T-slot is the bus address for the locations into which the parameter will be read or written when it is accessed by the server in a subsequent move or move and command. The parameter description also includes the access rights which identifies which way the parameter can be sent, either from client to server (read access) or server to client (write access) or both, and whether the paramater can be transferred multiple times. The initial parameter will always go from the client to the server one time.

Then for the reply pebble, a pointer is stored into the bundle's pebble list. A TID is allocated and the parameter descriptor is formatted for the Reslot. The R-slot is node dedicated just as was the case for the T-slots. The Reslot has write-once only access. As with the N-slot TID, the V-slot TID table is updated so the T-slots and R-slot can be mapped to their respective parameter descriptors by the channel.

The action is now ready. The action can be sent out to the server's node immediately if the channel's outgoing queue is empty. Otherwise, the action is added to a queue and will be handled automatically in turn. When automatically processing the queue, the channel enforces the flow control rule of the message based bus protocol which is that only one parameter at a time may be sent to a specified TID. The start buffer itself and the optional initial parameter as a whole are treated as a single parameter in this transfer. A SIOW (start I/O write) packet will be sent out on the bus which includes a source TID identifying the N-slot on the client from which the start buffer and initial parameter is being taken. The packet will also include the destination TID of the N-slot on the server for receiving the start buffer and initial parameter. Then there is a data portion in subsequent packets which will include the entire start buffer and the initial parameter if there is one. After the channel has been set up to transmit the start buffer and initial parameter, the startport is unlocked and the action ID assigned to the action is returned to the calling program.

At the server side, an accept command is performed in order to prime the hardware for receiving the start buffer. The accept command creates an action at the server for the purposes of receiving client/server requests described by a start buffer. If the accept command has not taken place by the time the start buffer has been sent by the client, the start buffer's SIOW packet will be stored in a data structure called the conx. If the accept command was completed first, the hardware can immediately process the start buffer and send it along to the buffer as described by the designated N-slot.

Figure 11:
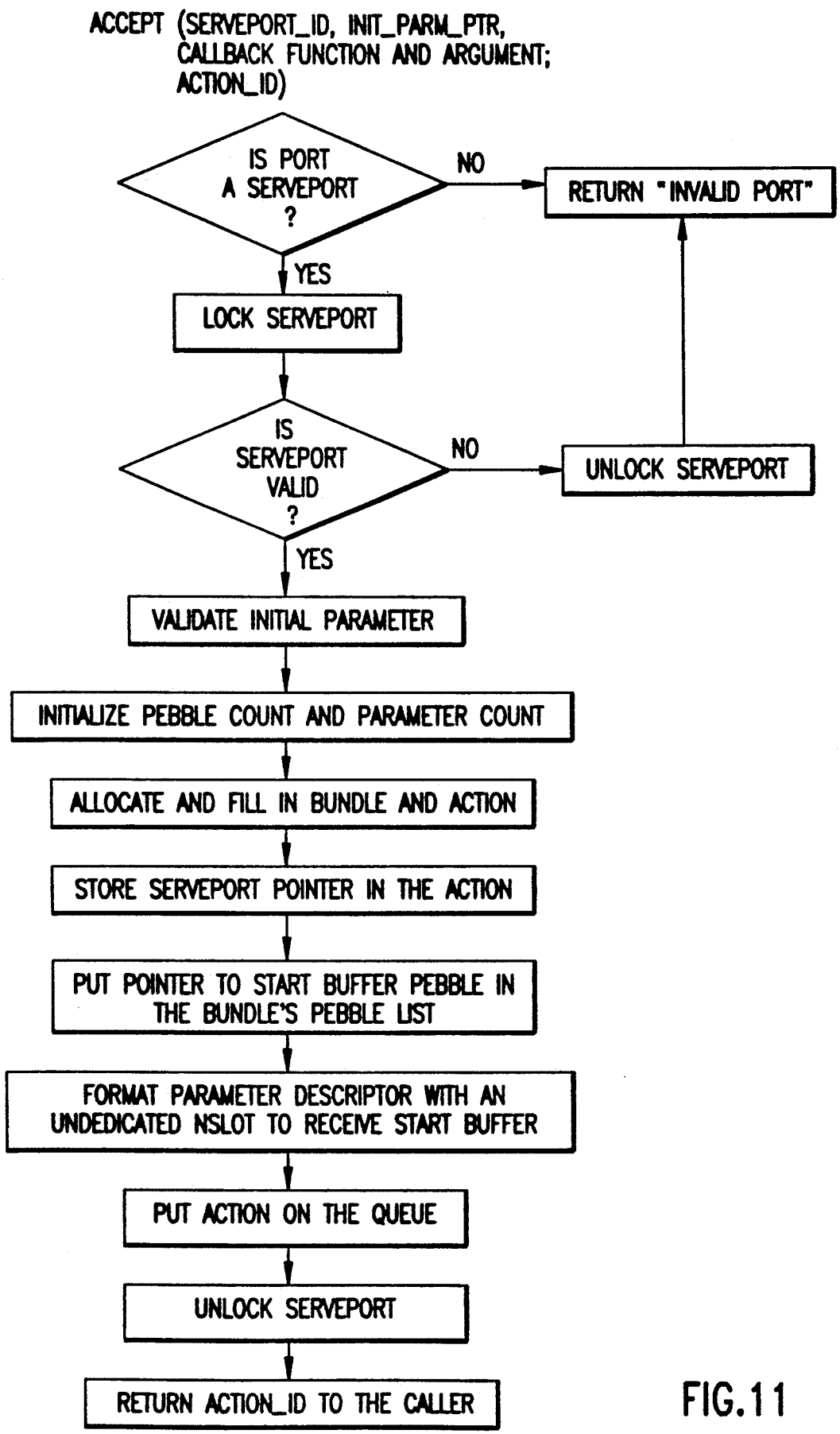
FIG. 11 is a flow chart for an ACCEPT request used in the capability-based protocol for the system of FIG. 1.

Referring now to FIG. 11, the flow chart for the accept command is illustrated. The accept command is issued with the arguments including a serveport ID. The serveport ID was provided to the calling application program by the create command. A callback function and argument is issued along with the accept command so that the calling program will learn the results of the accept.

The supplied arguments including the serveport ID are verified. Then the program checks to see if the serveport has an initial parameter. It can do this by just checking whether the maximum initial parameter size is greater than 0 in the serveport. If there is no initial parameter then the program checks the initial parameter in the server's address space to make sure that it is set at QNULL, otherwise there is an illegal initial parameter and that message is returned. If there is an initial parameter it is checked to make sure that it is valid. In other words, it is checked to see that its length does not exceed the maximum length allowable and that it has a proper function code. If the initial parameter is invalid, an error to that effect is returned.

After validating the initial parameter, the pebble count and parameter counts are initialized. For an accept command, the parameter count is 0 or 1, depending on whether or not there is an initial parameter. The pebble count is always 1 for an accept. The pebble will describe the entire start buffer and, if provided, the initial parameter.

The accept command is then ready to allocate and fill in a bundle and an action data structure. The action includes the storage locations for the start buffer and a reply buffer. The action points to the bundle. If the port allows an initial parameter the start pebble will also include a pointer to the initial parameter. Further details have already been described since the bundle and the action are the same as discussed above with respect to the action set up by the start command on the client side. However, the N-slot TID is formatted differently since the data is being received. Therefore, the TID has write-once access only. A pointer to the serveport is stored in the action.

Next, the flow chart specifies that the bundle's pebble list includes a pointer to the start buffer pebble. The pebble structure can then be built for the start buffer and initial parameter. Now, the hardware may be primed to receive the start buffer via its N-slot. The N-slot was assigned by the connection manager when it created the wire. The N-slot is set to be undedicated so that any node can write into it. Thus, when a shared wire policy is in place multiple clients may use the N-slot. If necessary, an anxious conx is found and the bus transaction resumed. Then the serveport can be unlocked. Finally, the accept command returns an action ID, identifying the action to the calling program.

Figure 12A:
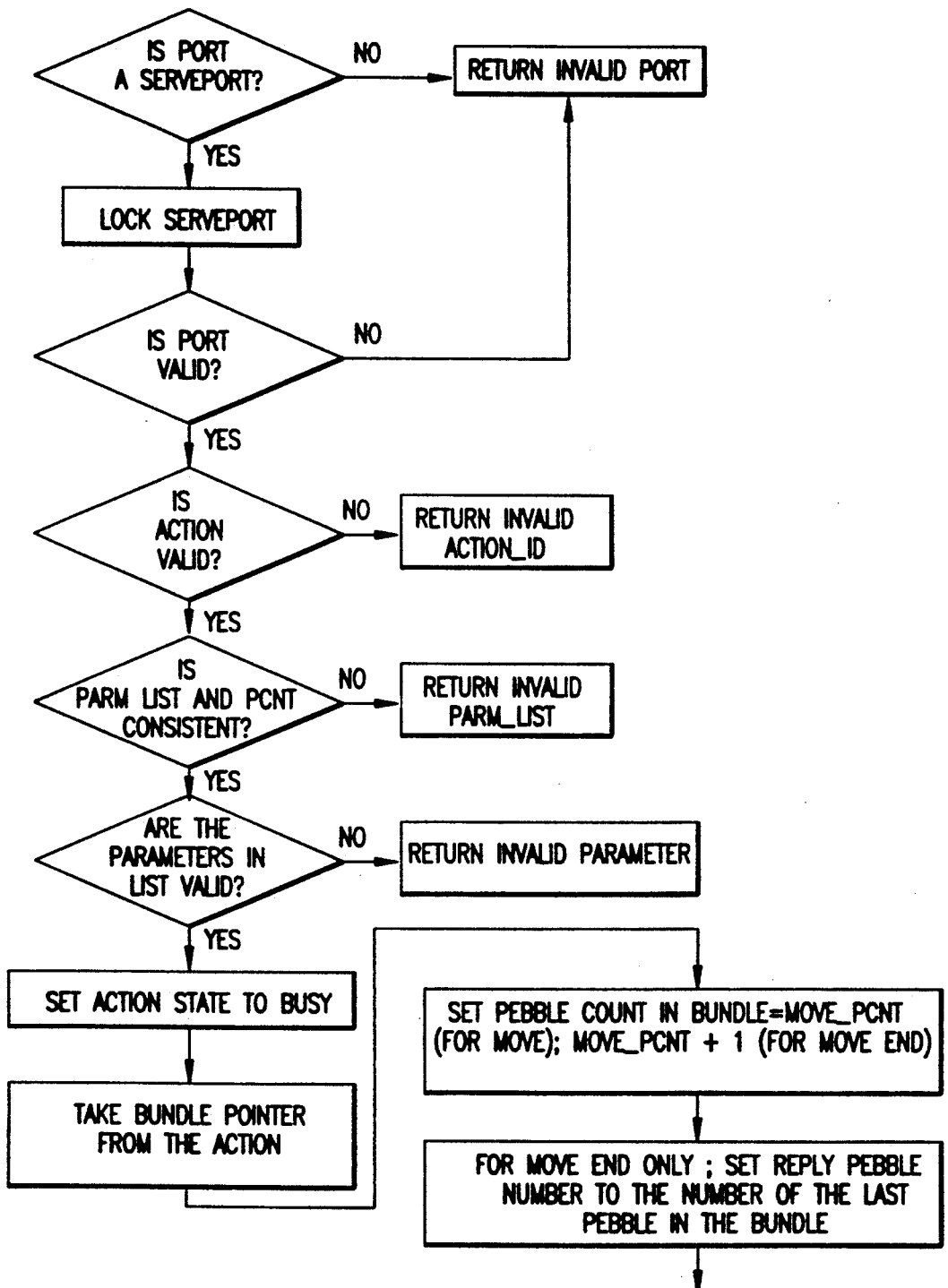
FIGS. 12a and 12b is a flow chart of both a MOVE request and MOVE END request performed by the capability-based protocol on the system of FIG. 1.
Figure 12B:
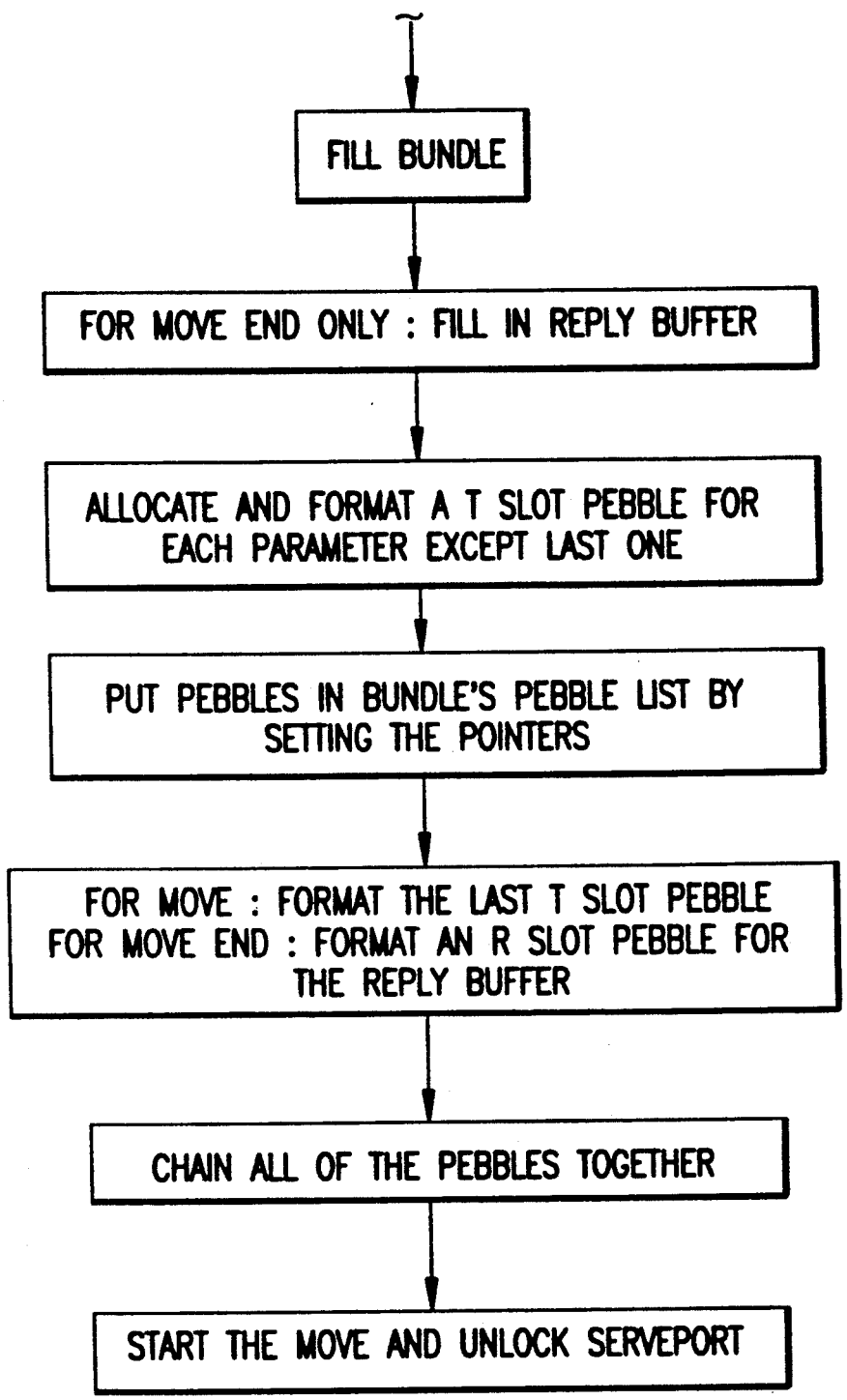

Once a connection has been made and a client/server request started by the client and accepted by the server, the server can begin sending data to or from the client. Data is transferred by using move commands. The last move command to be performed for the action is a MOVE END command. Program steps for each of these instructions is shown in the flow chart of FIGS. 12a and 12b. The server, which initiates the MOVE or MOVE END will indicate the serveport ID which will be transferring the data. Also included will be the action ID which was set up by the accept request. The move count is the number of parameters being moved and the move list identifies each of those parameters. The callback function and argument provide the means for informing the server when the move instruction has been completed.

The first step is to check that the serveport ID correctly identifies a serveport. The serveport if correct, is locked. The port is then checked to see that it is valid. This is done by making sure that the serveport is not being deleted. Once the serveport has been checked out, the action is checked. The validity of the action is determined by checking its structure ID to make sure that it indicates that it is indeed an action involved with this serveport and that it is currently representing an active client server request.

Next, the parameter list is checked to make sure that it has the same number of parameters as are indicated by the pcount. If the paremeter list is inconsistent with the parameter count "invalid parameter list" is returned. If the two are consistent, the parameters in the list are then checked to make sure that they are valid by making sure each parameter references a parameter within the client's request. Also, the parameter's function code is checked for validity. If everything checks out, the action state is set to busy. The action provides a pointer to the bundle. The pebble count in the bundle should be set equal to move pcount for the move instruction. For a move end instruction, since a reply buffer will be sent along with the parameters, the pebble count is set to move pcount plus one. In doing a move end instruction, the last pebble in the bundle will be made the reply pebble.

Next, all the information in the bundle is filled in. In the move end instruction the reply buffer must be filled in as well. The reply buffer is a message defined by the capability-based protocol and contains a formation such as the request-id for the action which is completing, and the reply status which indicates if the request is ending in success or with an error. The reply status is passed in the move end only. The pebbles used in a move instruction are used to format T-slots. T-slots are start dedicated with access set according to the parameter's function code. Start dedicated means that no other node will be allowed in the chassis to initiate a transfer with the slot. The T-slots are allocated and formatted for all of the parameters except the last one in the move instruction. In a move end instruction, all of the parameters have a T-slot allocated and formatted. The T-slot pebbles, after they have been formatted, are added into the bundle pebble list by setting the pointers in the list to the newly formatted T-slot pebbles. Next, in a move instruction the last T-slot pebble is formatted. Whereas in a move end instruction, an Reslot pebble for the reply buffer is formatted. As with the T-slot, an Reslot is start dedicated. All of the pebbles are chained together to form a queue which the channel can follow. After the protocol layer initiates the first transfer, the channel automatically follows the pebbles from one to the next in transferring the data in or out over the system bus. Thus, once the pebbles have been chained together, the move can be started and the serveport unlocked.

Figure 13A:
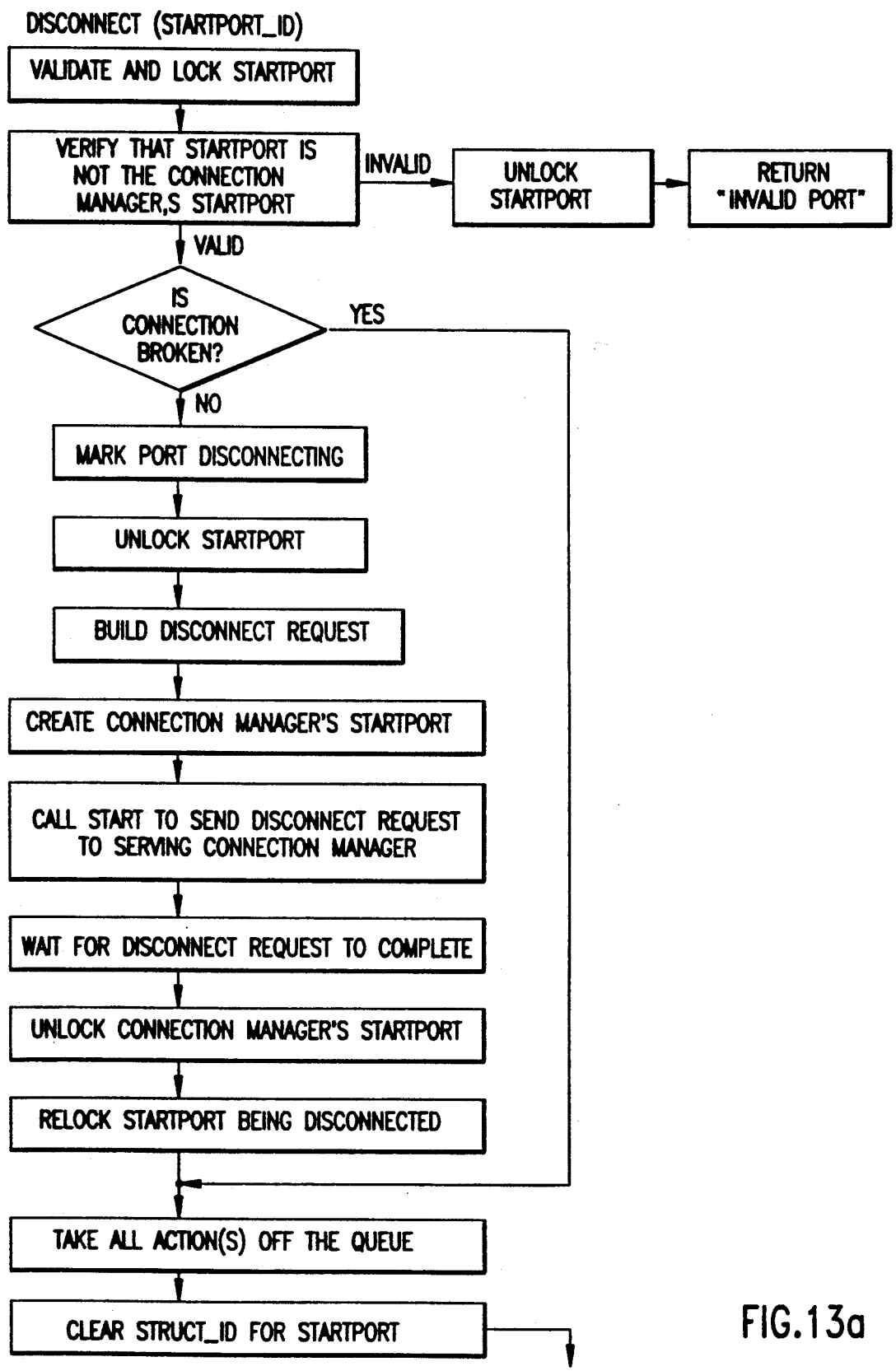
FIGS. 13a and 13b is a DISCONNECT request for use in the capability-based transaction protocol for use on the system of FIG. 1.
Figure 13B:
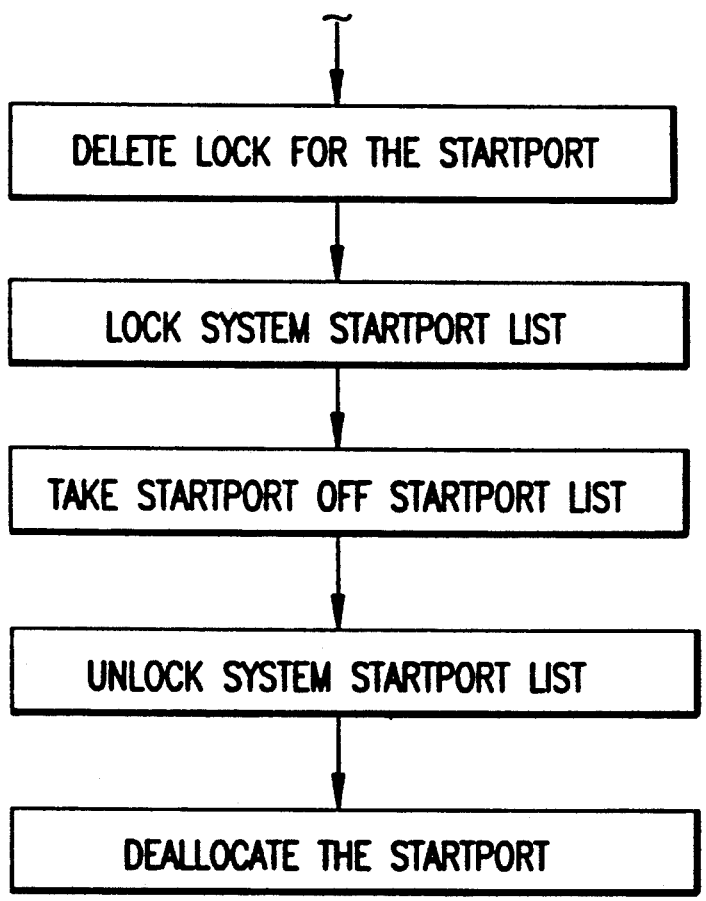

A connection can be interrupted by either the client or the server. The client interrupts the connection by performing a disconnect request. The server interrupts connection by performing a break request. The disconnect request is shown in FIGS. 13a and 13b. The client passes the disconnect request an argument which is the startport in the client that is participating in the connection. The startport is checked to make sure that it is valid. Once the validity has been assured, the startport is locked. The startport ID is checked to make sure that it does not identify the connection manager startport. If it does, there is an error, since the connection manager startport does not describe a regular client connection. Therefore, the startport would be unlocked and the "invalid port" message is returned. If a valid startport is identified, the program checks to see if there is a valid connection. If the connection is already broken, only the client cleanup needs to be dons. If there is a valid connection, the startport is marked as in the state of disconnecting. The startport is unlocked and a disconnect request is built. A disconnect request is a message in the capability-based protocol, and includes the name of the serveport at the server as well as the server's N slot. These are taken from the startport. The connection manager startport in the client module is used in order to send the disconnect request to the correct server node. The start request is called so as to send the disconnect request to the server's connection manager. The connection manager receives the disconnect request and performs a handle disconnect which will be discussed with reference to the next figure. The client waits for the disconnect request to complete and validates the reply status. The connection manager startport is unlocked and the startport whose connection is being broken is relocked.

Then the cleanup may begin. All actions are taken off the channel queue. All action resources (memory and TIDS) are freed and the client requests in progress are informed via the start complete callback the request was aborted due to a client disconnect. The structure ID which identifies the startport as such is cleared. The lock for the startport is deleted. The system startport list is locked. The disconnected startport is taken off the list and the startport list is then unlocked. Finally, the memory locations for the startport are deallocated. This then completes the disconnect request.

Figure 14A:
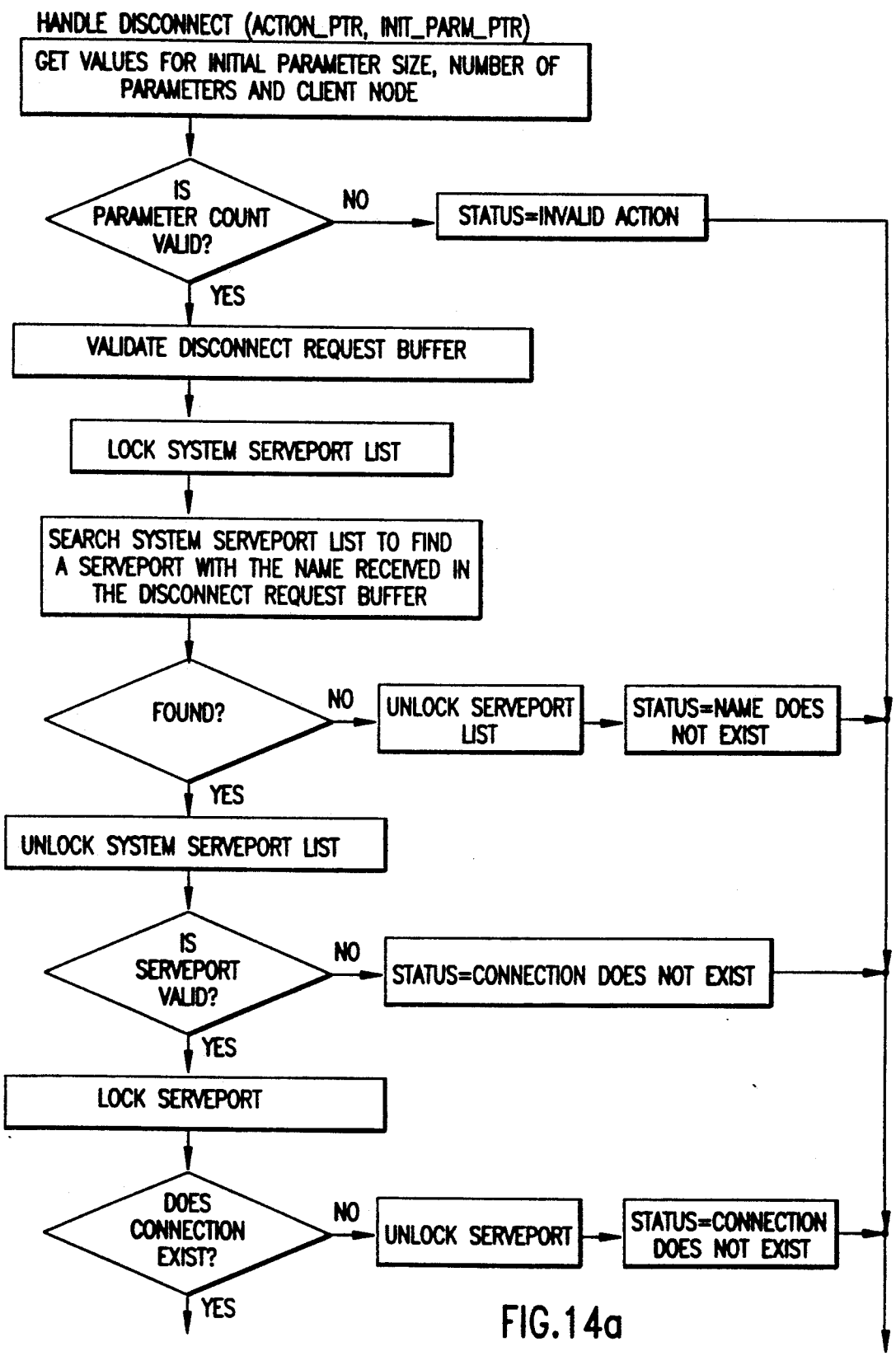
FIGS. 14a and 14b is a flow chart of a HANDLE DISCONNECT routine which may be called by the chart in FIG. S.
Figure 14B:
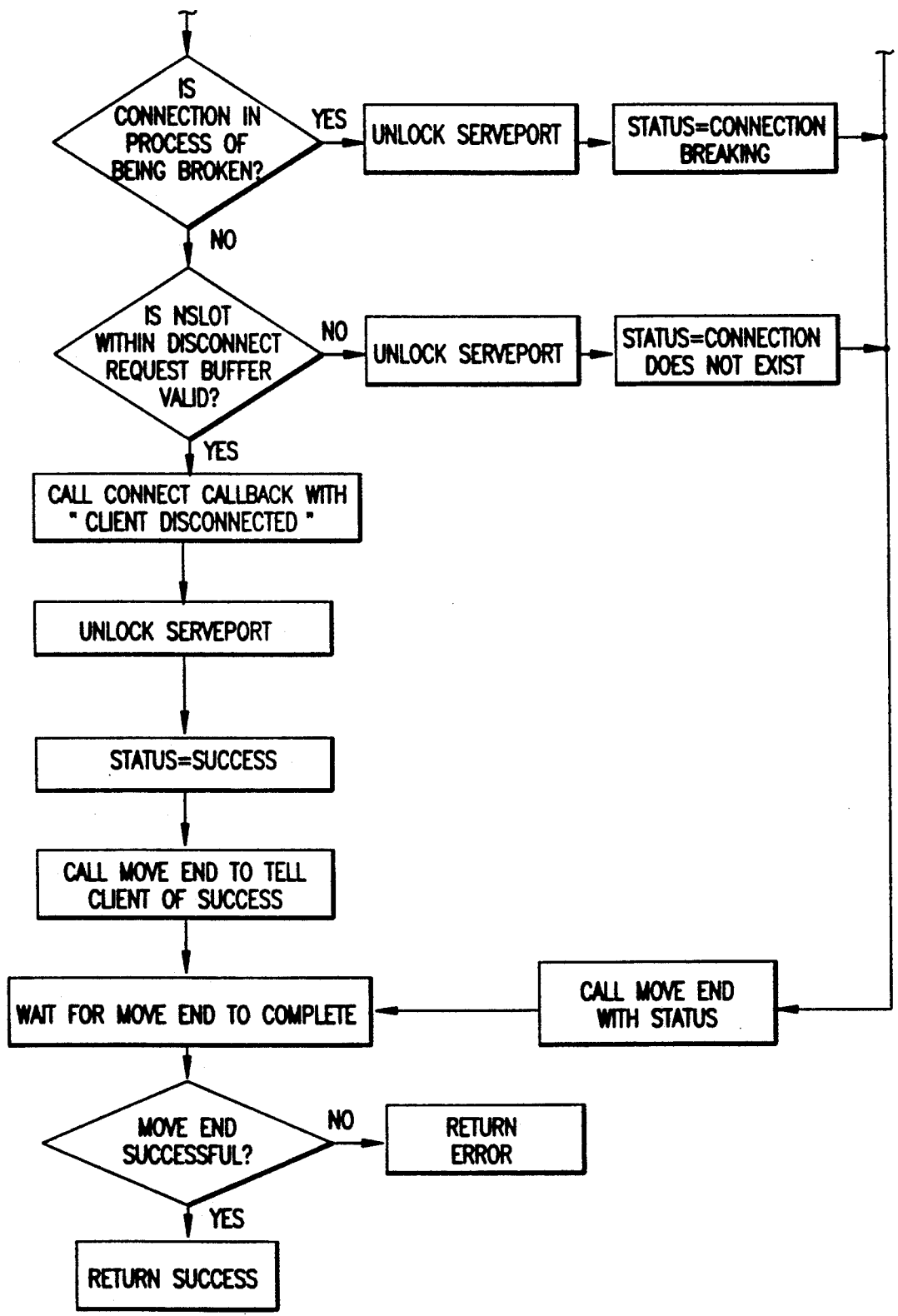

On the server side, when the connection manager receives the disconnect request, it will perform the handle disconnect function of FIGS. 14a and 14b after going through the connection manager steps shown previously in FIG. 8. The connection manager extracts from the disconnect request's start buffer, the initial parameter size, the number of parameters and the client node. The parameter count is checked to determine that it is valid. Validity is checked by making sure the parameter count is equal to 1. If the count is invalid, a status indicator is set at equal invalid action. The disconnect request buffer will be validated as long as the parameter count checks out. The validation insures that the initial parameter is indeed a disconnect request and that the disconnect request does not address a port which is all 0's, in other words, it makes sure that the disconnect request does not address the connection manager startport. Otherwise, an error status is set to indicate an invalid serveport name.

The system serveport list is locked. In the buffer which received the initial parameter of the disconnect request a name for the serveport to be disconnected is found. The system serveport list is searched to find a serveport with this name. If the serveport is not found, the serveport list is unlocked and the status indicator is set to show that the name does not exist. Once the serveport name has been found, the serveport list is unlocked.

Next, the serveport once found is checked to make sure that it is valid. This is done by making sure that the structure ID identifies the port as a serveport. If the port is not valid, the serveport is unlocked and the status indicator is changed to indicate that a connection does not exist with the client. If the connection does exist, the next step is to see if the connection is in the process of being broken. If so, the serveport is unlocked and the status is set to indicate that the connection is breaking. Next, the N-slot within the disconnect request buffer is validated by making sure the N-slot matches the N-slot used by the wire. If the connection does indeed exist, the next step is to call the connect callback function to indicate to the server that the "client is disconnected". The serveport is unlocked. Status is set equal to success. Move end is performed to tell the client of the reply status of the disconnect request. The server waits for the move end to complete. If the move end is successful, success is returned to the connection manager, otherwise, an error is indicated. Any of the errors indicated by the status indicator are returned to the client by a move end instruction.

Figure 15:
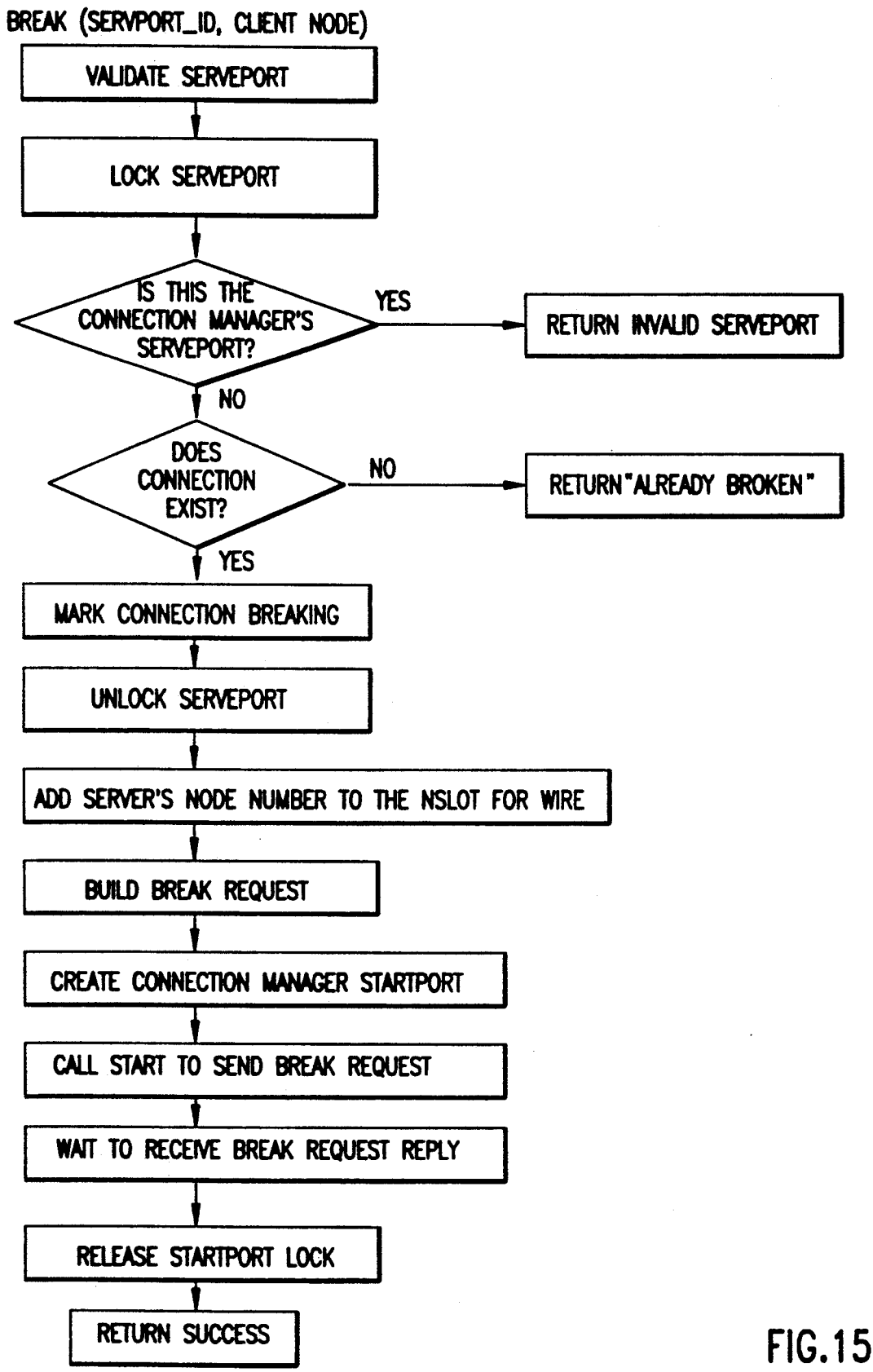
FIG. 15 is a flow chart of a BREAK request for use in the capability-based protocol for the system of FIG. 1.

A server can also disrupt a connection by issuing a break request as shown in FIG. 15. The break request is provided with the serveport ID and the client node. The client node identifies which connection on the serveport the server wishes to disrupt. The serveport is first validated and then locked. The program makes sure that the serveport is not the connection manager's serveport by determining that its name is not 0. Then a check is made to see if the connection does exist. If all this checks out, the connection is marked as breaking. The serveport is unlocked. Then, the N-slot TID is calculated by adding the server's node number to the N-slot for the wire. A break request, which is a message defined by the capability-based protocol, is then built indicating the name of the service and the N-slot TID from the wire. The connection manager's startport is used in order to send the break request to the correct client node. Start is called to send the break request to the connection manager at the client. The break program waits to receive the break request reply. Once the reply is received, startport lock is released and success is returned. Any outstanding actions then have their resources released (memory & TIDS) and the server requests are completed and notified that the connection was broken via their operation callback.

Figure 16A:
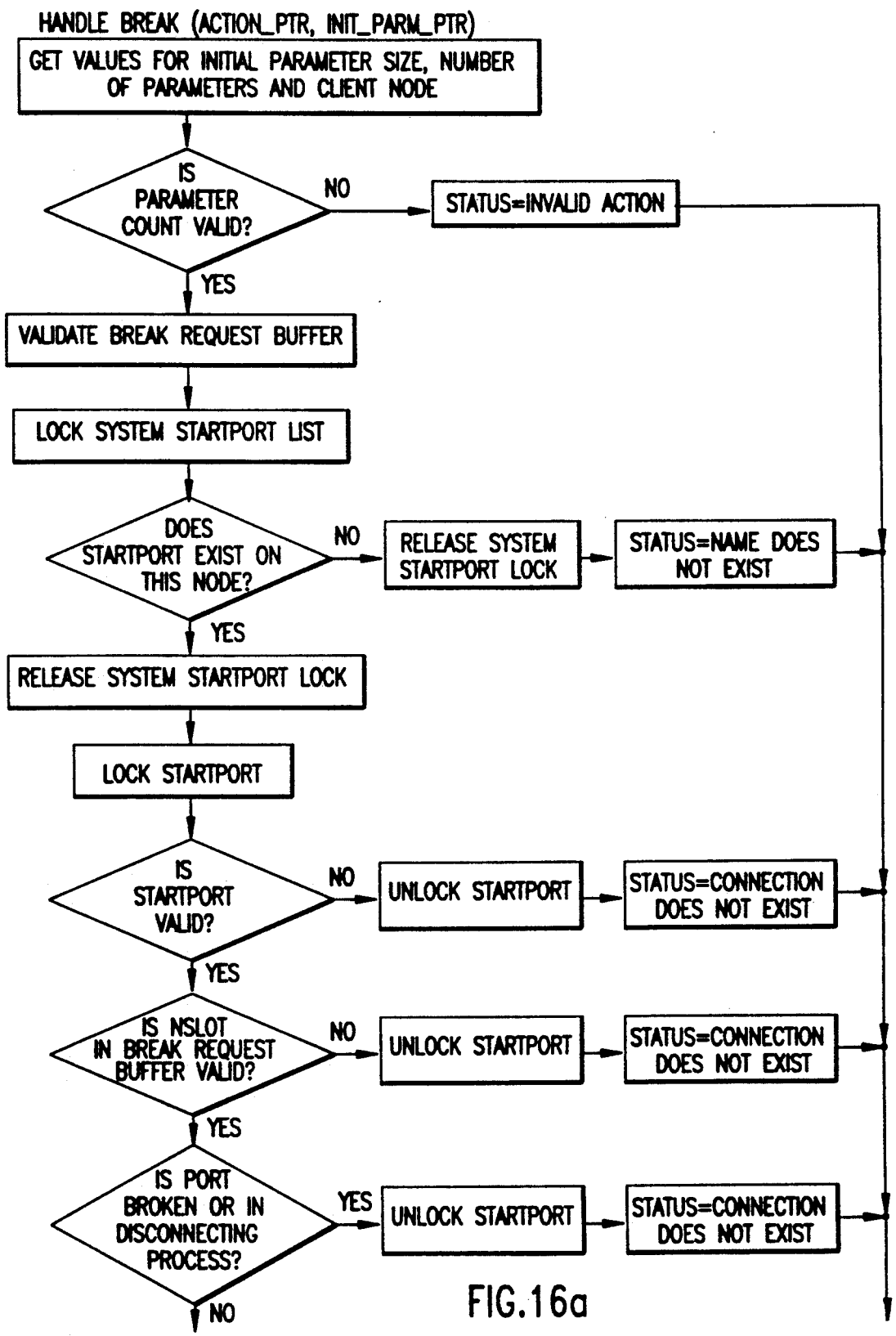
FIGS. 16a and 16b is a flow chart of a HANDLE BREAK routine which may be called by the chart of FIG. 8.
Figure 16B:
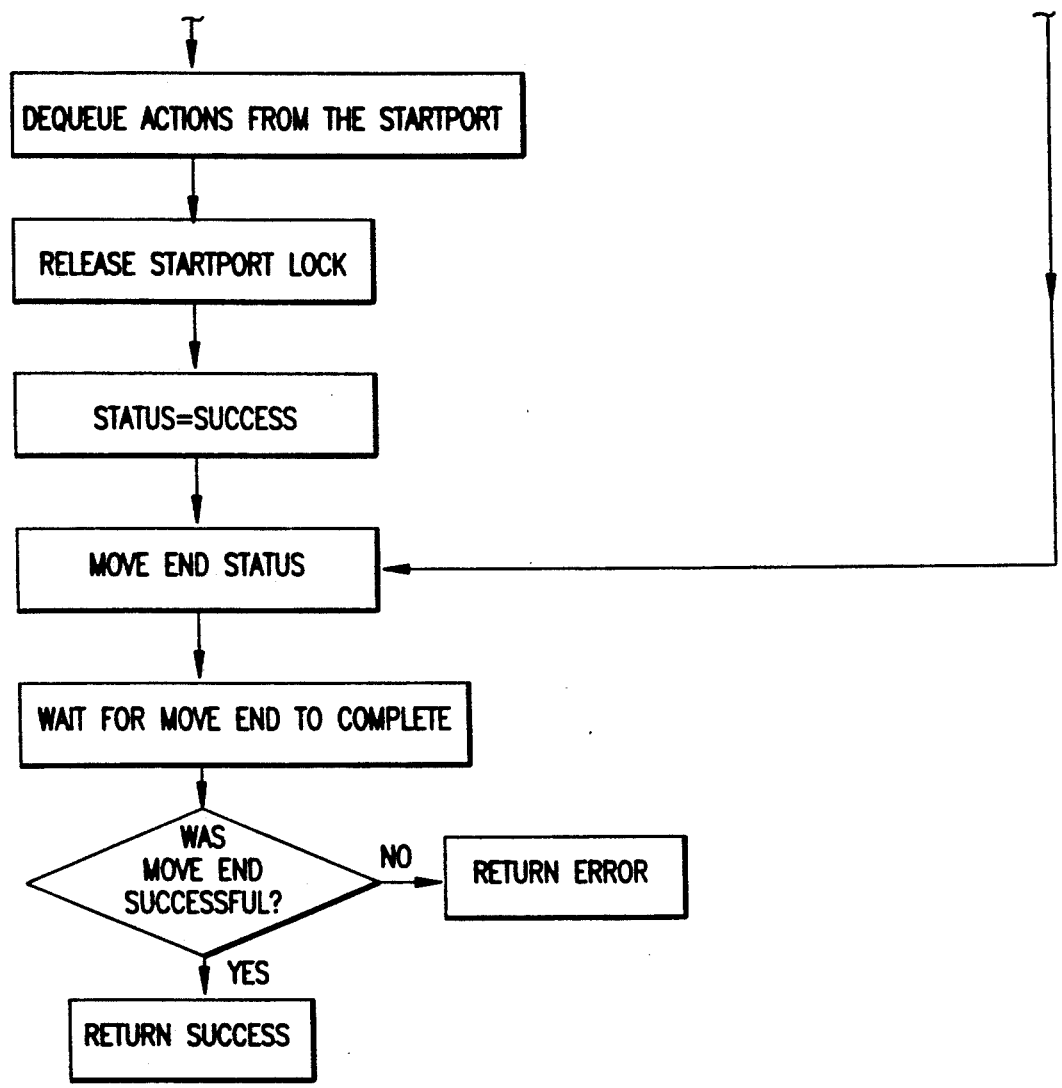

At the client side when a break request is received by the connection manager, the handle break program is performed as shown in FIGS. 16a and 16b. The handle break request is provided with an action pointer and an initial parameter pointer. Handle break begins by getting the values of the initial parameter size, the number of parameters and the client node from the break request. The parameter count, buffer and startport for the connection identified in the break request are all located and validated. The N-slot TID in the break request must match the server's N-slot TID in the startport to be valid. If the N-slot is not valid, status is set to "connection does not exist". If the N-slot is valid, then the next thing that is checked is to see if the port is broken or in the disconnecting process. If either of these is the case, the status is set for "connection does not exist". If all of these validity checks are passed, the next step is to dequeue all actions from the startport. The action resources (memory and TIDS) are released and the client is informed via the start complete callback that its request has been terminated due to a break. Then the startport lock can be released. Status is set to success. The status is returned to the server by a move end request. The program waits for the move end to complete. If the move end was successful, success is returned, if not, an error is returned to the connection manager.

Figure 17:
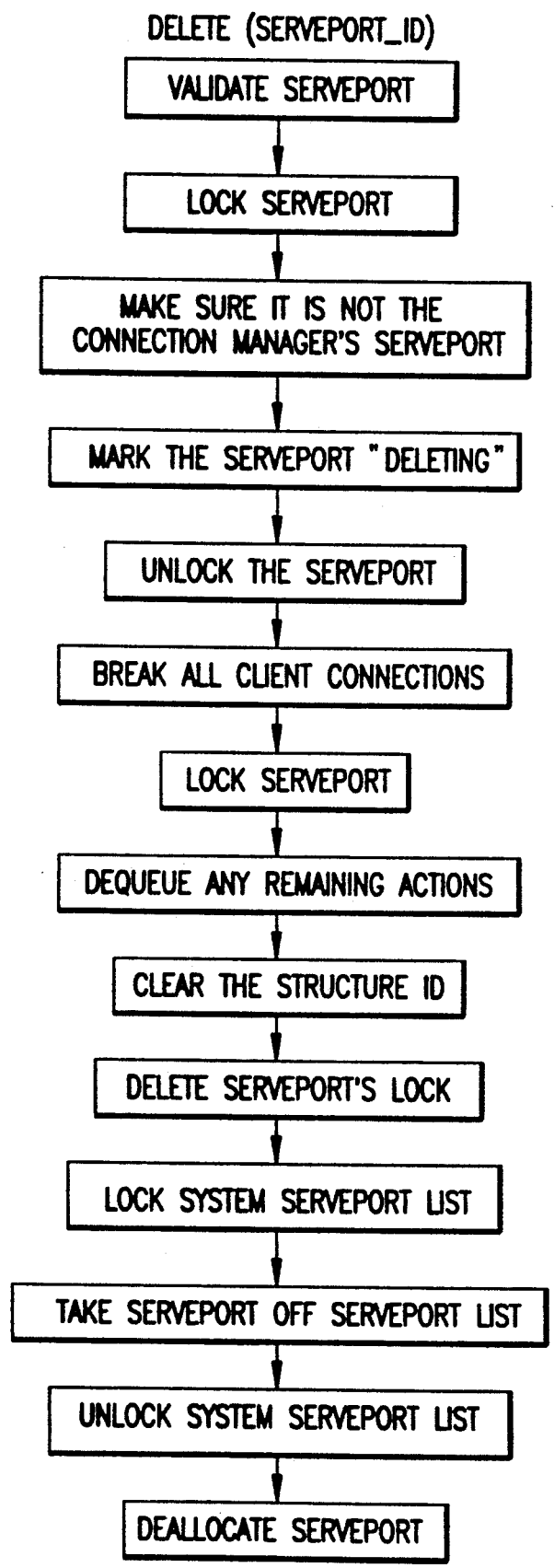
FIG. 17 is a flow chart of a DELETE request for use on the system of FIG. 1.

A server may also delete a serveport which requires breaking all of the connections to that serveport. The flow chart for performing a delete function is shown in FIG. 17.

By using the protocol as described above, clients and servers may communicate with one another regardless of whether they are host systems or IO device controllers. The integrity of the system is maintained through the use of capabilities. Since data may only be sent through a capability, it is highly unlikely with the present system that any such data would get sent to the incorrect address.

There has been described a new and improved capability-based transaction protocol. It should be appreciated that modifications will be made by others to the preferred embodiment described herein in applying the teachings of the present invention. Accordingly, the present invention is not to be limited by the disclosure of the specific flow charts and commands described above, but rather the present invention should only be interpreted in accordance with the appended claims.

We claim:

1. In a channel acting as a server on a system bus, the method of completing a communication connection with a client module on the system bus comprising the steps of:

creating a serveport data structure and assigning it a serveport name;

receiving a connect request from said client module, said request including a client node number identifying said client module and a serveport name;

determining that the serveport data structure whose name was received from said client has been created;

allocating an n-slot TID at said server for the desired connection, said n-slot TID being a capability used in identifying a storage location in said server for receiving start buffer data from said client module, said start buffer data including one or more additional TIDS identifying storage locations in said client module for use in subsequent transfers between said channel and said client module; and returning a connect answer from said server to said client module, said answer including said n-slot TID so that said client module knows where to send said start buffer data to said server.

2. The method of claim 1 further comprising the step after determining that the serveport has been created of further determining that an n-slot TID has not already been allocated for making a connection with said client module.

3. The method of claim 1 wherein said step of creating further includes setting a policy for said serveport data structure such that either each client module from which a connect request is received gets its own n-slot TID or each client module from a single channel shares a single n-slot TID.

4. The method of claim 1 wherein said step of creating further includes setting a maximum parameter count and a maximum initial parameter size for said serveport data structure and wherein said connect answer further includes said maximum parameter count and said maximum initial parameter size.

5. A communication protocol for a module acting as a server through a capability-based bus system comprising the steps of:

creating a serveport data structure and giving it a name;

receiving a connect request for said serveport data structure from a client;

returning a connect answer to said client which provides said client with an n-slot TID which is allocated at said server and acts as a capability within said server;

inserting a pointer, corresponding to the n-slot TID, into a TID map table so that said n-slot TID is mapped by said table onto a descriptor identifying the size and location of a memory storage area in said server for receiving start buffer data from said client.

6. The communication protocol of claim 5 further comprising the step of building an action data structure before returning a connect answer, said step of building including setting aside storage locations in said server for start buffer data and reply buffer data and providing a list of server TIDS identifying locations in said server for further communications between said server and said client.

7. The communication protocol of claim 5 wherein said start buffer data includes a list of client TIDs used as capabilities in identifying storage locations for use in transferring data between the server and said client and further comprising locally allocating a list of server TIDs on said server and transferring data between one of said server TIDs on said server and one of said client TIDs on said client from said list of client TIDs.

8. The communication protocol of claim 7 wherein said start buffer data further includes the identity of a reply TID in the client used as a capability in identifying a storage location for receiving reply buffer data and further comprising locally allocating a reply TID in the server for holding reply buffer data to be transferred and transferring said reply buffer data from the storage location identified by the reply TID in the server to the storage location identified by the reply TID in the client.

9. The communication protocol of claim 5 wherein the descriptor also identifies access rights for the memory storage area for receiving the start buffer data.

10. A communication protocol for a module acting as a client through a bus system comprising the steps of:
   sending a connect request to a server;
   receiving a connect answer including a server n-slot TID allocated at said server and used as a capability in identifying a storage location in said server for receiving start buffer data;
   locally allocating a first storage location in said client for holding the start buffer data;
   locally allocating a client n-slot TID used as a capability to identify said first storage location in said client for holding start buffer data;
   locally allocating a second client TID for identifying a second storage location in said client for receiving reply buffer data;
   locally allocating one or more further client TID's for identifying one or more further storage locations in said client as needed for transferring additional data to or from said server;
   inserting a pointer, corresponding to the client n-slot TID, into a TID map table so that said n-slot TID is mapped by said table onto a descriptor identifying the size and location of the first storage location for holding the start buffer data.

11. The communication protocol of claim 10 further comprising the step of receiving said reply buffer data from the server and then transferring additional data between said one or more further storage locations and storage locations in said server identified by server TIDs supplied in said reply buffer data.

12. The communication protocol of claim 10 further comprising sending a disconnect request to the server, receiving a disconnect answer from the server and allocating said first storage location for holding the start buffer data.

13. The communication protocol of claim 10 wherein the descriptor further identifies access rights for the storage location for holding the start buffer data.

14. A method for communicating between a client and a server comprising the steps of:
   transmitting a connect request from the client to the server;
   building an action data structure in the server by allocating storage locations in the server for start buffer data, reply buffer data and a list of server TIDs for further transfers of data between the server and the client;
   transmitting a connect answer from the server to the client, said connect answer being responsive to said connect request and including a server n-slot TID used as a capability in identifying the storage location in the server for receiving start buffer data from the client;
   allocating a storage location for holding the start buffer data in the client, said start buffer data including a list of client TIDs identifying storage locations in the client for use in transferring additional data between the server and the client;
   inserting a pointer, corresponding to a client n-slot TID into a TID map table so that said n-slot TID is mapped by said table onto a descriptor identifying the size and location of the storage location in the client for holding the start buffer data; and
   using said pointer to transfer the start buffer data from the client to the storage location identified by the server n-slot TID.

15. The communication of claim 14 wherein the descriptor further identifies access rights for the storage location for holding the start buffer data.

16. A communication protocol between a client and a server comprising the steps of:
   creating a serveport data structure in the server and giving it a name;
   receiving a connect request from the client, said request including a client node number identifying said client and said serveport name;
   transmitting a connect answer from the server to the client, said connect answer including a server n-slot TID allocated to said server for identifying a storage location in the server for receiving start buffer data;
   allocating a storage location in the client for holding the start buffer data in the client, said start buffer data including a list of client side TIDs identifying storage locations in the client for transferring data between the server and the client;
   inserting a pointer corresponding to a client n-slot TID into a TID map table so that said n-slot TID is mapped by said table onto a descriptor identifying the size and location of the storage location for holding the start buffer data in the client;
   using said pointer to transfer the start buffer data from the client to the storage location in the server identified by the server n-slot TID;
   locally allocating additional TIDs in said server for handling data transferred between the server and the client; and
   transferring additional data from a storage location identified by one of said local additional TIDs in said server to a storage location in said client identified by one of said client side TIDs from said list of client side TIDs in the start buffer data.

* * * * *